United States Patent
Stevens

(10) Patent No.: US 9,569,867 B2
(45) Date of Patent: Feb. 14, 2017

(54) VECTOR GRAPH GRAPHICAL OBJECT

(71) Applicant: SAS Institute Inc., Cary, NC (US)

(72) Inventor: Dale Stevens, Surrey (GB)

(73) Assignee: SAS INSTITUTE INC., Cary, NC (US)

( * ) Notice: Subject to any disclaimer, the term of this patent is extended or adjusted under 35 U.S.C. 154(b) by 210 days.

(21) Appl. No.: 14/330,208

(22) Filed: Jul. 14, 2014

(65) Prior Publication Data
US 2015/0077428 A1 Mar. 19, 2015

Related U.S. Application Data

(60) Provisional application No. 61/879,915, filed on Sep. 19, 2013.

(51) Int. Cl.
*G06T 11/20* (2006.01)
*G06Q 40/00* (2012.01)
*G06Q 40/04* (2012.01)
*G06Q 40/06* (2012.01)

(52) U.S. Cl.
CPC .................... *G06T 11/206* (2013.01)

(58) Field of Classification Search
None
See application file for complete search history.

(56) References Cited

U.S. PATENT DOCUMENTS

| | | | |
|---|---|---|---|
| 7,043,449 B1* | 5/2006 | Li et al. ................. | G06Q 40/04 705/36 R |
| 7,844,487 B2 | 11/2010 | Chapman | |
| 2009/0112932 A1* | 4/2009 | Skierkowski .......... | G06Q 10/06 |
| 2011/0137822 A1* | 6/2011 | Chapman ............... | G06Q 40/04 705/36 R |
| 2012/0271748 A1* | 10/2012 | DiSalvo ................. | G06Q 40/04 705/37 |

OTHER PUBLICATIONS

Apache OpenOffice, 2010, URL: https://wiki.openoffice.org/wiki/Documentation/OOo3_User_Guides/Calc_Guide/Gallery_of_chart_types, pp. 1-9.*

(Continued)

*Primary Examiner* — Jacinta M Crawford
*Assistant Examiner* — Phuc Doan

(57) ABSTRACT

Various embodiments are generally directed to techniques for increasing the amount of information conveyed per graphical object in graphical presentations of data. A non-transitory machine-readable storage medium includes instructions, that when executed, cause a computing device to determine a major range of values occurring during a major period, the major period including a shorter minor period; and generate a vector graph including a graphical object and an axis indicating a scale. The graphical object may include a major period line parallel to the axis and indicating the major range; and a minor period arrow overlying and pointing in a direction parallel to the length of the major period line, the point and base of the minor period arrow overlying the major period line at locations indicating values at an end and at a start, respectively, of the minor period. Other embodiments are described and claimed.

27 Claims, 20 Drawing Sheets

(56) References Cited

OTHER PUBLICATIONS

"Microsoft Project 2010", <http://www.microsoft.com/project/en/gb/project-portfolio-server-2007.aspx>, retrieved Oct. 25, 2013, 4 pages (author unknown).

"Data Visualization Gallery", Dunday Data Visualization, Project risk,<http://www.dundas.com/gallery/data-visualization-gallery/>, retrieved Oct. 25, 2013, 2 pages, (Author unknown).

"Creating an New Bubble Chart", <http://www.bubblechartpro.com/content/QS_Bubble_Chart_New.php>, retrieved Oct. 25, 2013, 2 pages, (Author unknown).

Data Visualization Gallery, Dunday Data Visualization, Sales vs. Target by Product Category, <http://www.dundas.com/gallery/data-visualization-gallery/>, retrieved Oct. 25, 2013, 2 pages, (Author unknown).

Tian et al., "Efficient Aggregation for Graph Summarization", SIGMOD'08, Jun. 9-12, 13 pages.

\* cited by examiner

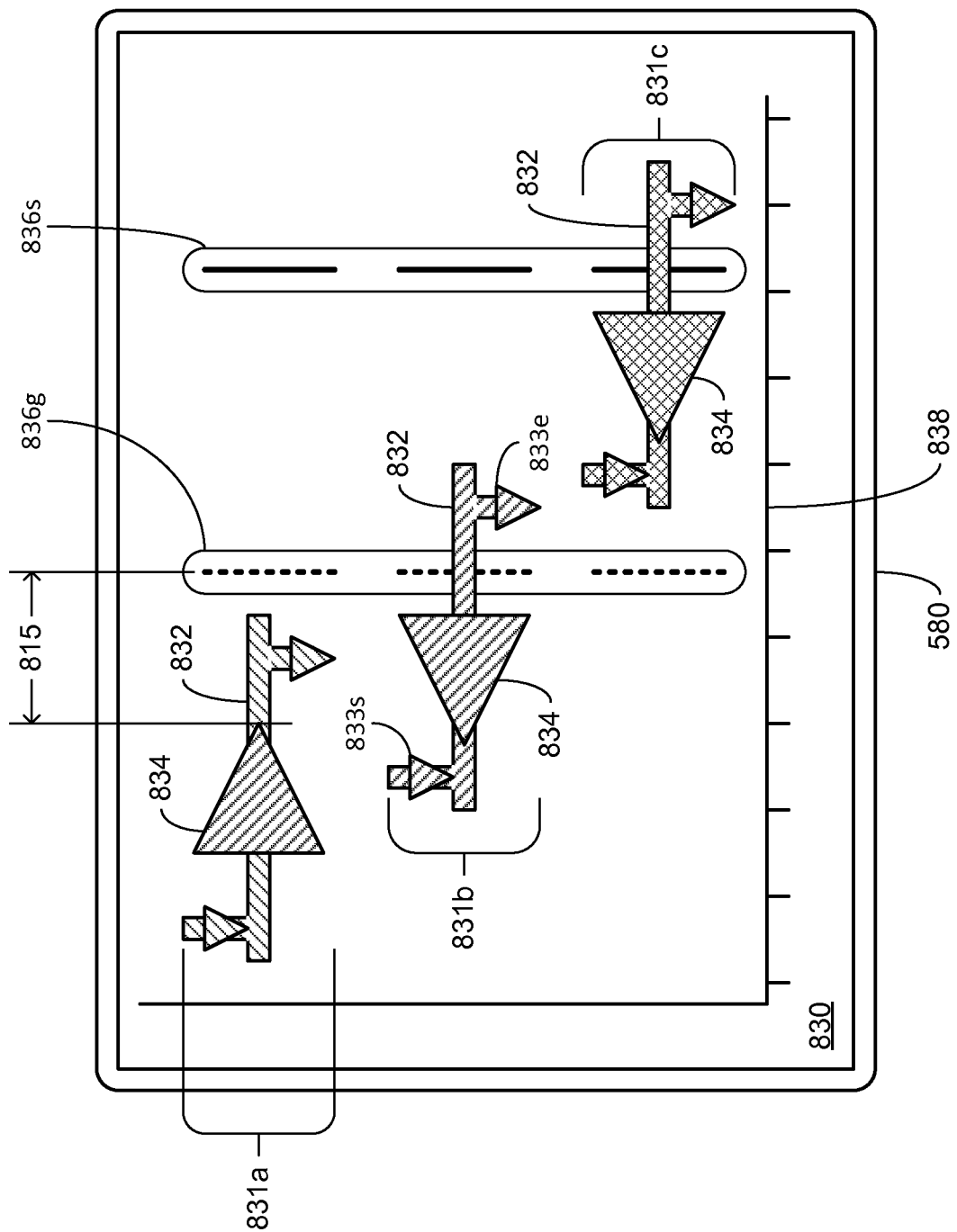
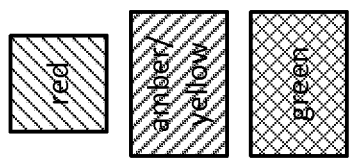
FIG. 6

VECTOR GRAPH GRAPHICAL OBJECT

CROSS-REFERENCE TO RELATED APPLICATIONS

This application claims the benefit of priority under 35 U.S.C. §119(e) to U.S. Provisional Application Ser. No. 61/879,915 entitled RAG VECTOR GRAPH OBJECT filed Sep. 19, 2013, the entirety of which is incorporated herein by reference.

BACKGROUND

With the creation and processing of ever larger data sets comes an accompanying challenge of presenting ever larger amounts of information from such data sets in a way that is compact and also easily understandable. Compactness is an especially useful attribute of devices with limited screen size or resolution, such as tablet computing devices or smart phones. Tables and prose (e.g., text phrases or sentences) have long been used to present information, but reading text takes typically longer than viewing a graphical presentation of information. Various approaches to graphically presenting information have been devised, but typically employ graphical objects that convey relatively little information per graphical object. Thus, a relatively high quantity of graphical objects are typically required to convey larger amounts of information, leading to a cluttered presentation that takes longer to view and understand.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

At least one non-transitory machine-readable storage medium may include instructions that when executed by a computing device, cause the computing device to determine a major range of values occurring during a major period, wherein the major period may include a minor period of shorter duration than the major period; and generate, by circuitry for visual presentation on a display, a vector graph that includes a graphical object and an axis indicating a scale of values that includes the major range. The graphical object may include a major period line that is parallel to the axis, wherein a length of the major period line indicates the major range of values; and a minor period arrow overlying the major period line and pointing in a direction parallel to the length of the major period line, wherein a point of the minor period arrow overlies the major period line at a first location that indicates a value at an end of the minor period, and a base of the minor period arrow overlies the major period line at a second location that indicates a value at a start of the minor period.

A computer-implemented method may include determining a major range of values occurring during a major period, wherein the major period may include a minor period of shorter duration than the major period; and generating, by circuitry for visual presentation on a display, a vector graph including a graphical object and an axis indicating a scale of values including the major range. The graphical object may include a major period line that is parallel to the axis, wherein a length of the major period line indicates the major range of values; a starting value indicator coupled to the major period line at a first location that indicates a value at a start of the major period; an ending value indicator coupled to the major period line at a second location that indicates a value at an end of the major period; and a minor period arrow overlying the major period line and pointing in a direction parallel to the length of the major period line, wherein a point of the minor period arrow overlies the major period line at a third location that indicates a value at an end of the minor period, and a base of the minor period arrow overlies the major period line at a fourth location that indicates a value at a start of the minor period.

An apparatus may include a processor component; an aggregation component to determine a major range of values occurring during a major period, wherein the major period may include a minor period of shorter duration than the major period; a vertical scaling component to generate for visual presentation on a display an axis of a vector graph indicating a scale of values including the major range; a line component to generate for visual presentation on the display a major period line of a graphical object of the vector graph parallel to the axis, a starting value indicator of the graphical object coupled to the major period line at a first location that indicates a value at a start of the major period and an ending value indicator of the graphical object coupled to the major period line at a second location that indicates a value at an end of the major period, wherein a length of the major period line indicates the major range of values; and an arrow component to generate for visual presentation on the display a minor period arrow of the graphical object overlying the major period line and pointing in a direction parallel to the length of the major period line, wherein a point of the minor period arrow overlies the major period line at a third location that indicates a value at an end of the minor period, and a base of the minor period arrow overlies the major period line at a fourth location that indicates a value at a start of the minor period.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

BRIEF DESCRIPTION OF THE DRAWINGS

FIG. 6 illustrates further examples of assignment of color to graphical objects.

DETAILED DESCRIPTION

Figure 1:
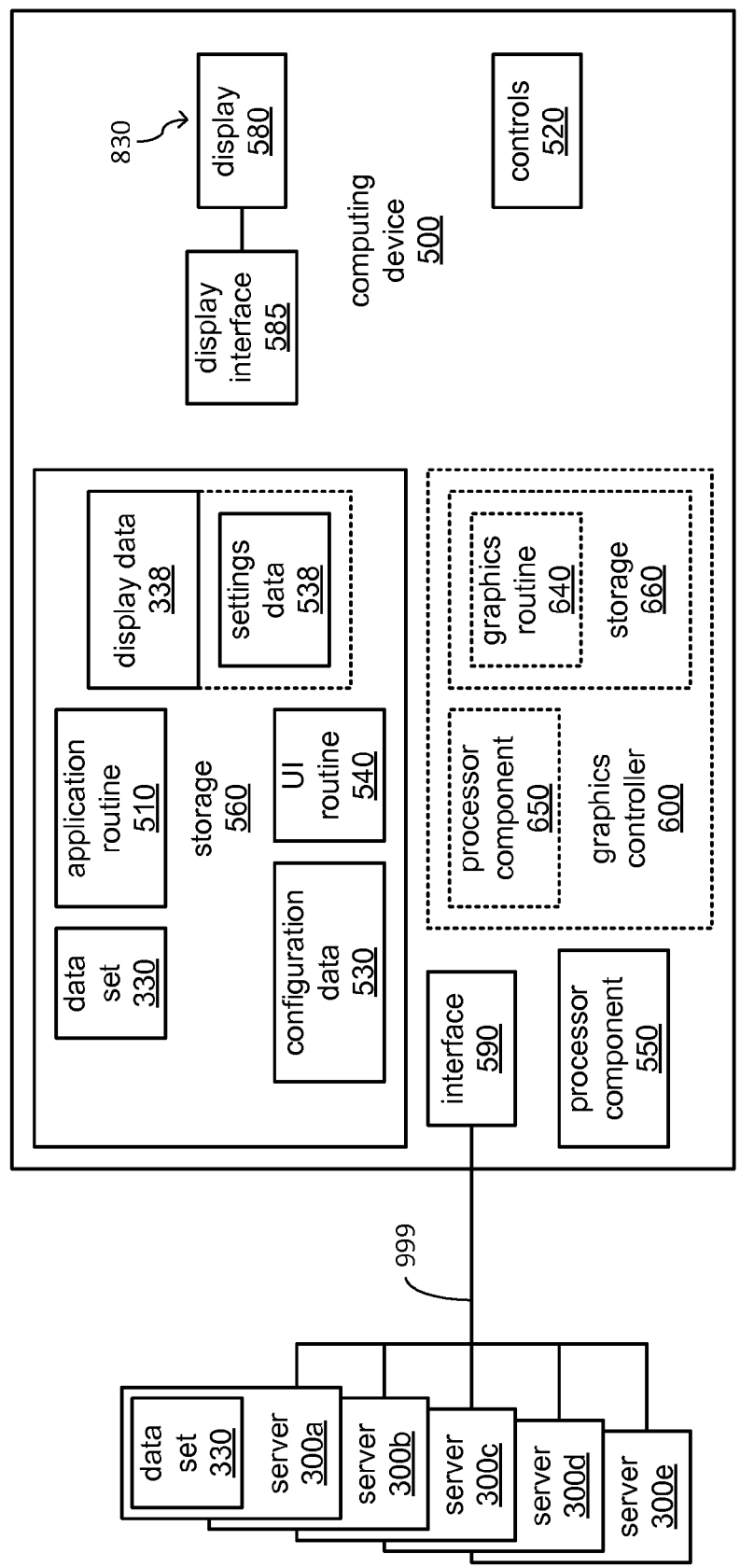
FIG. 1 illustrates an example of an embodiment of a visualization system.

Various embodiments are generally directed to techniques for increasing the amount of information able to be conveyed per graphical object in a graphical presentation of data. The graphical object conveys a range of data values, starting and ending data values, and a degree of importance of the data values associated with two periods of time. One of the two periods of time may be a major period and the other a minor period of shorter duration than the major period and occurring entirely within the major period. The graphical object may include indication(s) of a target value, an appetite value, and/or a tolerance value applicable to both the major and minor periods.

The range of data values occurring during the major period of time may be indicated with a major period line extending between the lowest and highest values occurring during the major period. The values occurring at the start and end of the major period of time may be marked by a starting value indicator and an ending value indicator, respectively, intersecting the major period line at locations along the length of the major period line that correspond to those values. The starting and ending data values of a minor period of time may be indicated by the length of a minor period arrow overlying and extending along the path of major period line. The values at the start and end of the minor period may be indicated by the locations of the base and point, respectively, of the minor period arrow along the length of the major period line.

The thickness of the major period line and the width of the minor period arrow may be varied to indicate a degree of importance of the data values associated with a graphical object. In some embodiments, the data values may be accompanied by indications of differing degrees of importance of different ones of the data values. In other embodiments, various criteria may be used in an analysis of the data values to determine their different degrees of importance.

A target value, an appetite value, and/or a tolerance value may be indicated by one or more value markers positioned inline with the path of the major period line. Such a value marker may be made up of a line extending generally crosswise across the path of the major period line at a location along that path that graphically indicates the value it represents relative to the values represented by the major period line and minor period arrow. Depending on those values, one or more value markers may be positioned at locations beyond an end of the major period line and/or at locations along the length of the major period line. The line making up such a value marker may be a dotted or dashed line to enable it to be easily visually distinguished from the starting value indicator and the ending value indicator, each of which may be made up of a solid line.

Value markers may each be assigned a color corresponding to the value they represent (e.g., one of a target value, an appetite value, or a tolerance value). Major period lines and/or minor period arrows may be assigned colors corresponding to trends in the values occurring during the major and minor periods, respectively, relative to one or more values represented by value markers. More broadly, colors may be associated with values approached, reached, exceeded, etc. that are deemed desirable, cautionary, or undesirable. In some embodiments, the data values may be accompanied by indications of assignments of colors. In other embodiments, the data values may be accompanied by indications of the types of values that the data values represent (e.g., cost, risk, quality of data, etc.) to enable assignment of colors based on type of value. In still other embodiments, various criteria may be used in analysis of the data values to determine their color assignments.

One or more of these graphical objects may be positioned alongside at least one axis setting forth an overall range of values in a vector graph generated for visual presentation. The at least one axis may be generated as a line extending parallel to the major period line of at least one of the graphical objects of the vector graph, and there may be gradations or other indications of values along the length the line making up the at least one axis. The overall range of values may be selected to encompass all values indicated by any portion of any graphical object displayed in the vector graph. The overall range of values may be explicitly indicated at increments along the at least one axis with alphanumeric or other characters.

To better enable interpretation of the meanings of line thickness, arrow width, and/or various colors, one or more visual guides may also be included in a vector graph. While a vector graph is visually presented, the position of a pointer associated with a user interface may be monitored, and one or more visual guides may be visually presented in the vicinity of a graphical object in response to the pointer hovering over or in the vicinity of that graphical object. Alternatively or additionally, a visual guide in the form of a legend may be included in the visual presentation of a vector graph including one or more graphical objects.

One or more manually operable controls may be monitored for an indication of selection of a graphical object while a vector graph is visually presented. In response to the selection of the graphical object, another vector graph that includes multiple graphical objects may be visually presented, each of those graphical objects representing data that was previously aggregated to derive values represented by the selected graphical object to enable "drilling down" into data. Alternatively, in response to the selection of the graphical object, the data represented by the selected graphical object may be aggregated with other data to generate a new graphical object to enable "drilling up" into data.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result.

These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a visualization system 1000 incorporating one or more servers 300a-e and/or a computing device 500. Each of these computing devices may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted, these computing devices 300a-e and 500 exchange communications conveying data set 330 to be visually presented through a network 999. However, one or more of the computing devices 300a-e and 500 may exchange other entirely unrelated to visually presenting data with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

The data set 330 may be any of a variety of types of data, including and not limited to, economic indicators, financial transactions, securities market prices, sales figures, production figures, census data, weather data, election results, etc. The data set 330 may simply be stored within one or more of the servers 300a-e awaiting retrieval by the computing device 500. Alternatively, the data set 330 may be compiled or otherwise derived from a search of greater quantities of data maintained by one or more of the servers 300a-e, the search conducted among one or more of the servers 300a-e in response to a request transmitted from the computing device 500. It should be noted that although a quantity of five servers 300a-e is specifically depicted, other quantities of computing devices may be employed in deriving and/or providing the data set 330 to the computing device 500.

In various embodiments, the computing device 500 incorporates one or more of a processor component 550, a storage 560, controls 520, a display screen 580, a display interface 585, a graphics controller 600 and an interface 590 to couple the computing device 500 to the network 999. The storage 560 may store one or more of each of the data set 330, an application routine 510, configuration data 530, a user interface (UI) routine 540 and a display data 338 that may include a settings data 538. The display interface 585 drives an image onto the display 580. The graphics controller 600, if present, incorporates one or more of a processor component 650 and a storage 660. The storage 660 of the graphics controller 600 (again, if present) stores a graphics routine 640. It is to be understood that although only one each of the application routine 510 and the UI routine 540 are depicted, various embodiments may incorporate more than one of each.

Figure 2:
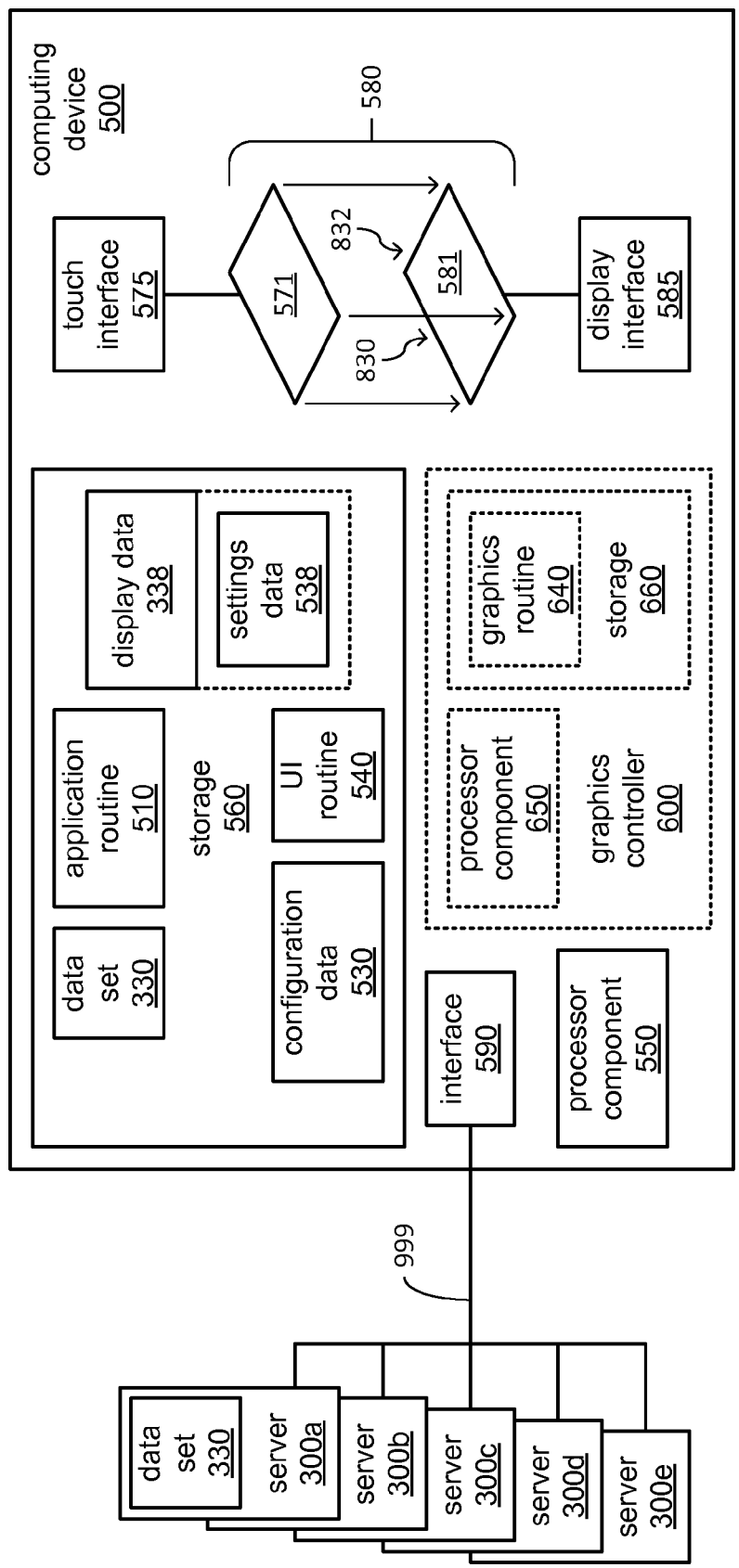
FIG. 2 illustrates an alternate example of an embodiment of a visualization system.

FIG. 2 illustrates a block diagram of an alternate embodiment of the visualization system 1000 featuring an alternate embodiment of the computing device 500. In FIG. 2, the alternate embodiment of the computing device 500 incorporates a touch-sensitive form of the display 580 in place of the combination of display 580 and controls 520 of the embodiment of the computing device 500 of FIG. 1. The touch-sensitive display 580 of the alternate embodiment of the computing device 500 of FIG. 2 incorporates a display element 581 and a touch element 571. The display element 581 may any of a variety of "flat panel" or other type of display element based on any of a variety of technologies, including and not limited to, a cathode-ray tube (CRT), an electroluminescent (EL) panel, a liquid crystal display (LCD), etc. The touch element 571 is combined with the display element 581 to provide a touch-sensitive input capability. The touch element 571 may be a substantially transparent overlay film incorporating resistive, capacitive, or other touch-sensitive technology to detect instances of a digit of a hand and/or other object (e.g., a stylus) touching the display 580. Alternatively, the touch element 571 may be made up of a combination of infrared (IR) or other light emitting and receiving components positioned about the periphery of the display element 581 to create a grid of beams to detect a touch of the display element 581 by detecting the accompanying interruption of one or more of the beams. The touch interface 575 is coupled to the touch element 571 to assist in monitoring the touch-sensitive surface of the touch element 571 to detect an instance of a touch, and to assist in determining the location of that touch on the touch-sensitive surface.

Returning to FIG. 1, the one or more application routines 510 and the one or more UI routines 540 each incorporate a sequence of instructions operative on the processor component 550 to implement logic to perform various functions. Each of the one or more application routines 510 may be any of a variety of applications that make use of a display to visually present data derived from the data set 330, including and not limited to, a database query application, a spreadsheet application, etc. Each of the one or more UI routines 540 may be a UI component of the application routine 510, a UI component of an operating system (OS) operative on the processor component 550, etc.

The processor component 550 executes at least one application routine 510 and at least one UI routine 540, and may execute multiple ones of each sequentially or concurrently. In executing the application routine 510, the processor component 550 may receive at least a portion of the data set 330 from one or more of the servers 300a-e, as previously discussed. Alternatively or additionally, in executing the application routine 510, the processor component 550 may generate at least a portion of the data set 330. Regardless of the exact manner in which the data set 330 is received and/or generated, at least a portion of the data set 330 is conveyed from the application routine 510 to the UI routine 540 as the display data 338 made up of values and ranges of values to be generated for subsequent visual presentation on a display, such as the display 580 or a display of another device. The processor component 550, in executing the UI routine 540, then generates the visual portion of a graphical user interface (GUI) including a vector graph 830 that includes one or more graphical objects indicating data values occurring during more than one period of time. The processor component 550 may then visually present at least the vector graph 830 on the display 580.

Figure 3:
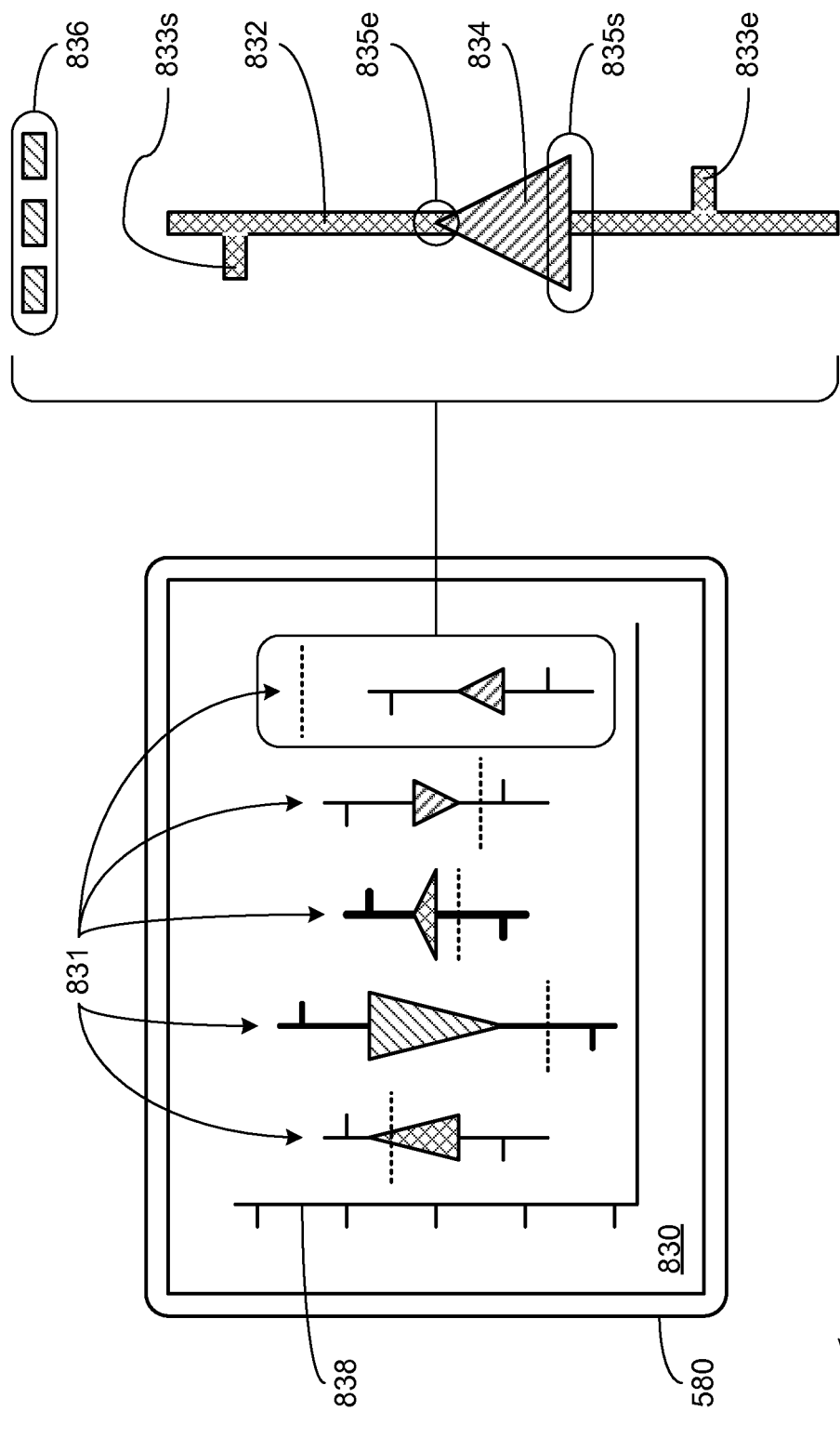
FIGS. 3 and 4, together, illustrate an example of an embodiment of a vector graph and of a graphical object thereof.
Figure 4:
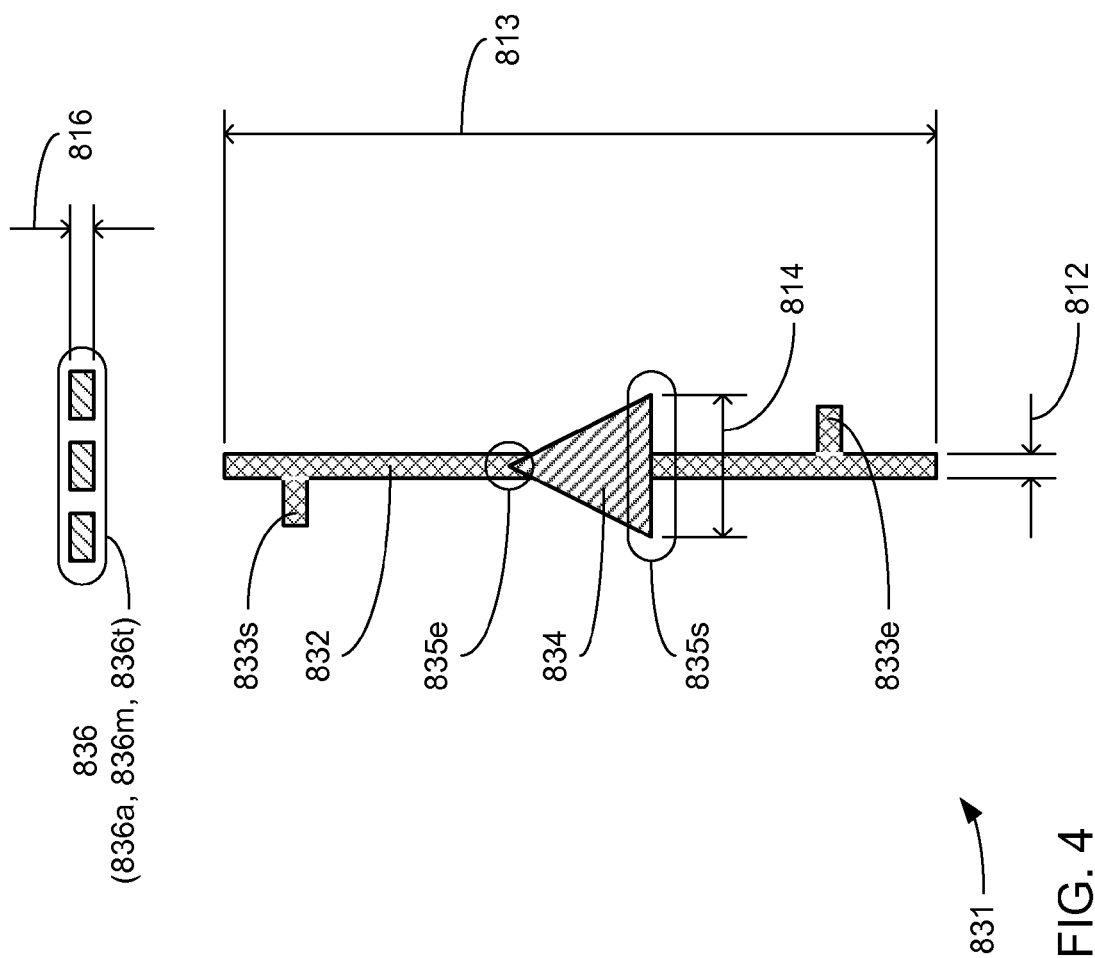

FIG. 3 illustrates an example of the vector graph 830 as it may be visually presented on the display 580, including multiple example embodiments of a graphical object 831. As depicted, the vector graph 830 includes multiple example embodiments of the graphical object 831 visually presented alongside at least one axis 838 that incorporates at least gradations or other indicia of a range of values. In some embodiments, the range of values of the axis 838 includes the all of the values or ranges of values indicated by each of the graphical objects 831 to provide a visual reference of what each of those values and/or ranges of values are. Also depicted in FIG. 3 is a close-up view of one of the graphical objects 831. FIG. 4 illustrates further features of the graphical object 831 in the close-up view of FIG. 3. It should be noted that in FIGS. 3 and 4, as well as in others of the figures, the association of various reference numerals to an object or portion of an object may be depicted with a lead line extending from a reference numeral to and into contact with that object or portion of an object. Alternatively, such an association may be depicted with a lead line extending from a reference numeral to a circle or oval that surrounds that object or portion of that object. It should also be noted that although numerous examples are presented herein of graphical objects 831 generated and visually presented in a vector graph 830 in a vertical orientation, other embodiments are possible in which graphical objects 831 are oriented horizontally in a vector graph 830.

Referring to both FIG. 4 and the close-up view of FIG. 3, the graphical object 831 incorporates a major period line 832 extending along a path that is parallel to the axis 838, and a minor period arrow 834 that overlies and extends along the path of the major period line 832. The length 813 of the major period line 832 indicates a range of values occurring during the major period of time. The major period line 832 incorporates a starting value indicator 833s that indicates what the value was at the start of the major period, and an ending value indicator 833e that indicates what the value was at the end of the major period. As depicted, the starting value indicator 833s is distinguished from the ending value indicator 833e based on which intersects the major period line 832 from a left side and from a right side. However, in other embodiments, the starting value indicator 833s and the ending value indicator 833e may be distinguished from each other by one or both including a visual cue such as an arrow or other directional indicator (not shown) pointing towards or away from the major period line 832. The base 835s of the minor period arrow 834 indicates what the value was at the start of the minor period, and the point 835e of the minor period arrow 834 indicates what the value was at the end of the minor period.

The major period of the major period line 832 is of greater duration than the minor period of the minor period arrow 834, and the minor period is a subset of the major period. Depending on the nature of the data presented via the graphical object 831, the major and minor periods may be defined to be any of a wide range of possible combinations of periods of time. By way of example, the major period may be defined as a calendar year and the minor period may be defined as one of the months thereof. By way of another example, the major period may be defined as a week and the minor period may be defined as a day thereof. By way of still another example, the major period may be defined as a second and the minor period may be defined as a fraction thereof. Numerous other possible definitions of periods of time for each of the major and minor periods may occur to those skilled in the art.

The values indicated by the axis 838 and the one or more graphical objects 831 included in any one of the vector graphs 830 may be relative values (e.g., proportions, percentages, etc.) or may be absolute values. However, at least for vector graphs 830 incorporating only one axis 838, it may be deemed appropriate to avoid mixing relative and absolute values to avoid confusion interpreting the values indicated by each graphical object 831.

The thickness 812 of the major period line 832 may be varied to indicate a degree of importance of the range of data values that it represents. Alternatively or additionally, the width 814 of the minor period arrow 834 may be varied to indicate a degree of importance of the range of data values that it represents. In some embodiments, the thickness 812 of the major period line 832 and the width 814 of the minor period arrow 834 may be varied in a coordinated manner to provide similar indications of degree of importance. In other embodiments, the thickness 812 of the major period line 832 and the width 814 of the minor period arrow 834 may be varied in differing ways relative to each other to indicate differences in the degrees of importance of the ranges of values of the major and minor periods, respectively. In some embodiments, the line thickness 812 and/or the arrow width 814 may indicate degrees of relative importance between multiple graphical objects 831 positioned side-by-side in a single vector graph 830, as depicted in the image of the example vector graph 830 of FIG. 3. In other embodiments, the line thickness 812 and/or the arrow width 814 may indicate degrees of relative importance among graphical objects 831 presented at different times in different vector graphs 830.

In some embodiments, the display data 338 may include indications of the relative degrees of importance of different ones of the values or ranges of values to be indicated with graphical objects 831 of a vector graph 830. In such embodiments, determinations of which values or ranges of values are of greater or lesser importance than others may be made at an earlier time based on the data set 330 and/or still other data not included in either the data set 330 or the display data 338. The processor component 550 may parse the display data 338 to retrieve such indications and may generate major period lines 832 and minor period arrow 834 with thicknesses 812 and widths 814, respectively, based on those indications. In other embodiments, the settings data 538 may include indications of criteria (e.g., values, ranges of values, rates of change of values, etc.) that may be employed by the processor component 550 in analyzing the values or ranges of values of the display data 338 to determine their relative degrees of importance. The processor component 550 may determine the thicknesses 812 of major period lines 832 and widths 814 of minor period arrows 834 based on the analysis.

In some embodiments, the graphical object 831 may include one or more value markers 836 crossing the path of the major period line 832, if not overlying and crossing the major period line 832 and/or the minor period arrow 834. The value markers 836 may each be made up of a line extending more crosswise than parallel to the path of the major period line 832 to provide an indication of a single value. In some embodiments, the value markers 836 may each be made up of a line extending perpendicular to the path of the major period line 832. Further, the line of which each value marker 836 is made up may be a dotted or dashed line to render the value markers 836 more immediately visually distinguishable from the starting value indicators 833s and the ending value indicators 833e.

As depicted more specifically in FIG. 4, there may be different types of the value markers 836 included in a single graphical object 831, including a target value marker 836t, an appetite value marker 836a, and/or a tolerance value marker 836m. A target value marker 836t may be visually presented to indicate a goal value that is deemed desirable to reach, to stay above or to stay below. An appetite value marker 836a may be visually presented to indicate a value that is less desirable than a target value, but that would likely pose little in the way of ill effects if met or even if passed. A tolerance value marker 836t may be visually presented to indicate an absolute maximum value that is not to be exceeded or an absolute minimum value that must at least be met to avoid what may be considerable ill effects.

As with the major period line 832, the thickness 816 of the line of which each of the value markers 836 are made up may be varied to indicate a relative degree of importance of the values represented. By way of example, reaching one target value indicated by one value marker 836 in one graphical object 831 may be of somewhat lesser importance than reaching another target value indicated by another value marker 836 in another graphical object 831 presented in the same vector graph 830. Not unlike the major period lines 832 and the minor period arrows 834, indications of which target, appetite and/or tolerance values are of greater importance than others may be included in the display data 338, and selections of thicknesses 816 of one or more of the value markers 836 may be based on such indications. Alternatively, the thickness 816 of a value marker 836 may be based on a degree of importance of the graphical object 831 of which that value marker is a part, which as previously discussed, may be indicated in the display data 338 or determined from indications in the display data 338 of the types of values included in the values or ranges of values making up the display data 338. Thus, the thickness 816 of a value marker 836 of a particular graphical object 831 may coincide with the thickness 812 of the major period line 832 of that particular graphical object 831.

As depicted in FIGS. 3 and 4 with different cross-hatching patterns, each of the graphical objects 831 may be assigned a different color. Alternatively or additionally, different components of each graphical object 831 may be assigned a different color such that the major period line, the minor period arrow, and/or one or more of the value markers 836 may be assigned different colors. In some embodiments, value markers 836 may each be assigned a different color depending on the type of value represented. Thus, target value markers 836t, appetite value markers 836a, and tolerance value markers 836m may each be assigned a different color to enable each type to be visually more easily distinguishable from the others. In various embodiments, a major period line 832 and/or a minor period arrow 834 may each be assigned a color based on a change in value towards or away from a target value, an appetite value, and/or a tolerance value.

In some embodiments, the display data 338 may include indications of what colors are assigned to what values or ranges of values. The processor component 550 may then parse the display data 338 to obtain the indications of color and then employ those indications of color in generating graphical objects 831. Alternatively or additionally, the settings data 538 accompanying the display data 338 and/or the configuration data 530 may provide indications of colors to assign based on types of values represented by values or ranges of values of the display data 338. The processor component 550 may then parse the display data 338 for indications of types of values associated with the values or ranges of values to be represented with graphical objects 831. Thus, for example, one or more of the display data 338, the settings data 538 and the configuration data 530 may include an indication that, at least as a default, all target value markers 836t are to be assigned the color green, all appetite value markers 836a are to be assigned the color amber (yellow) and all tolerance value markers 836t are to be assigned the color red (e.g., colors inspired by those typically used for traffic lights). For one or more particular values or ranges of values, the display data 338 may include indications of exceptions to such a default.

Also alternatively or additionally, various criteria may be employed by the processor component 550 in analyzing values or ranges of values of the display data 538 to determine what colors to assign to at least major period lines 832 and/or minor period arrows 834. Such criterion may include whether a target value, an appetite value or tolerance value is reached, exceeded, etc. Alternatively or additionally, such criterion may include whether the change in value from start to end of a major period and/or a minor period is toward or away from a target value, an appetite value or a tolerance value. Also alternatively or additionally, such criterion may include a threshold of how close the range of values of a major period, the value at the end of a major period, the range of values of a minor period and/or the value at the end of a minor period came to reaching a target value, an appetite value or a tolerance value.

Figure 5:
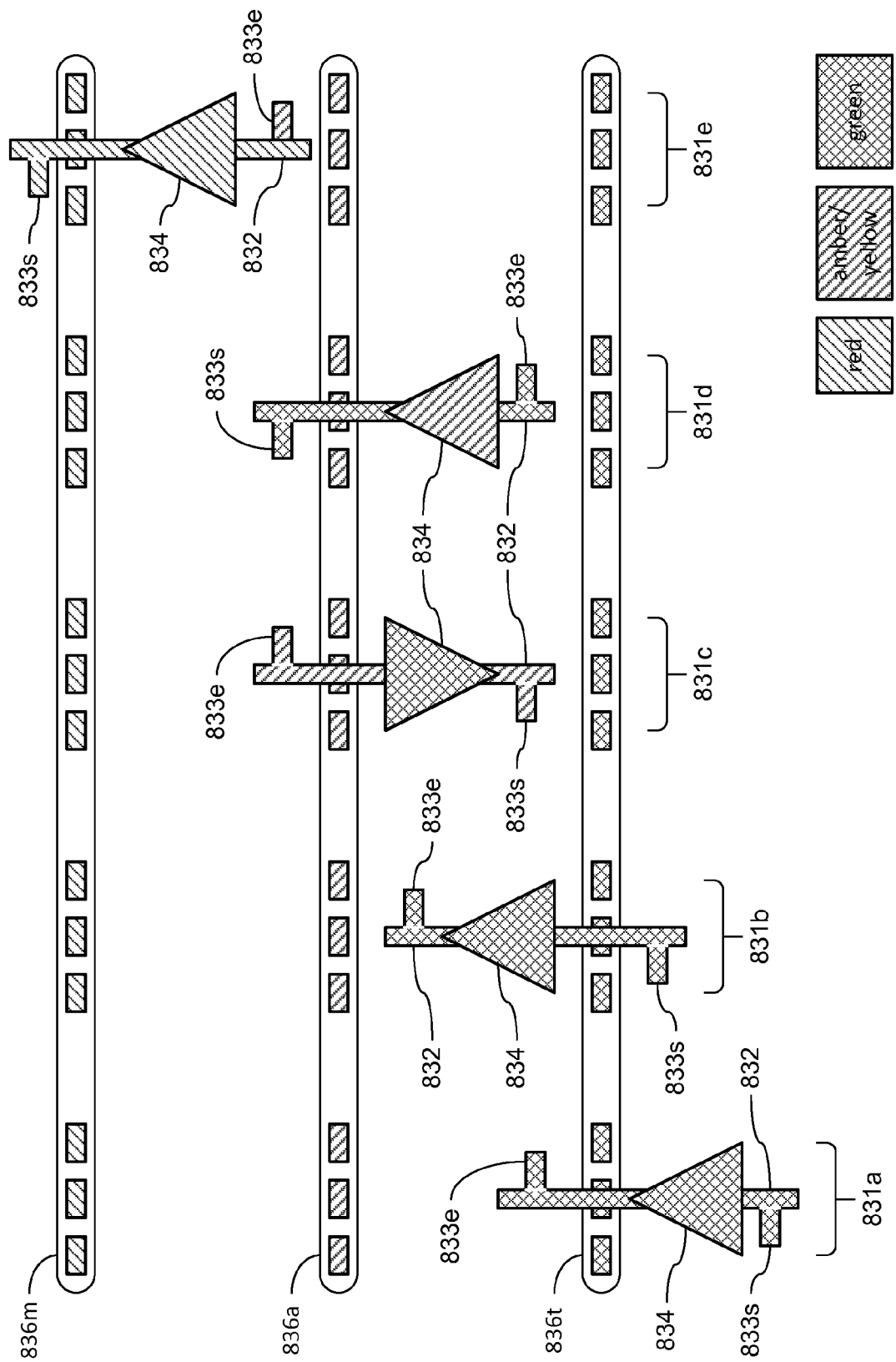
FIG. 5 illustrates examples of assignment of color to graphical objects.

FIG. 5 illustrates various examples of assignment of color to graphical objects 831 and/or portions of graphical objects 831. More specifically, five different instances of graphical object designated 831a through 831e are presented as examples of the application of various criterion to determine assigned colors. Also presented across all five of the graphical objects 831a-e are example assignments of color based on type of value for value markers 836a, 836m and 836t.

As depicted, each of the graphical objects 831a-e includes a target value marker 836t, an appetite value marker 836a and a tolerance value marker 836m. The target value markers 836t are assigned the color green reflecting the desire to reach the target value. The appetite value markers 836a are assigned the color amber (yellow) reflecting that exceeding the target value to the point of reaching the appetite value is still acceptable, but conveying a reminder that it may not be desirable to exceed the target value by much more than that. The tolerance value markers 836t are assigned the color red reflecting that exceeding the target value to the point of reaching the tolerance value is not desirable and is likely deemed to be deleterious in some way.

As depicted, in both graphical objects 831a and 831b, the major period line 832, the minor period arrow 834, starting value indicator 833s and the ending value indicator 833e are all assigned the color green. In some embodiments, this may reflect a default of assigning color based on which value marker 836 is crossed, or at least reached, by a major period line 832 of a graphical object 831. Since, the major period 832 of both of the graphical objects 831a and 831b cross a target value 836t, the components 832, 833s, 833e and 834 of each of the graphical objects 831a and 831b are assigned the color green.

The graphical objects 831c and 831d depict examples of possible exceptions to the default assignment of color just described with respect to the graphical objects 831a and 831b. Turning to the graphical object 831c, instead of an assignment of the color amber (yellow) to the minor period arrow 834 based on the major period line 832 crossing the appetite value marker 836a, the minor period line 834 is assigned the color green as a result of the change in values it represents being a change towards the target value represented by the target value marker 836t. Stated differently, although the range of values of the major period includes the appetite value represented by the appetite value marker 836a, the direction of change in value of the minor period is away from the appetite value and towards the target value represented by the target value marker 836t. Turning to the graphical object 831d, instead of an assignment of the color amber (yellow) to the major period line 832 based on the major period line 832 crossing the appetite value marker 836a, the major period line 832 is instead assigned the color green as a result of the change in values it represents being a change towards the target value represented by the target value marker 836t. Stated differently, although the range of values of the major period includes the appetite value represented by the appetite value marker 836a, the direction of change in value of the major period is away from the appetite value and towards the target value represented by the target value marker 836t.

The graphical object 831e depicts an example of a different possible exception to the default assignment of color described with respect to the graphical objects 831a and 831b. Instead of an assignment of the color red to the ending value marker 833e based on the major period line 832 crossing the tolerance value marker 836m, the ending value marker 833e is assigned the color yellow as a result of the change in values represented by the major period line 832 being a change towards the appetite value represented by the appetite value marker 836a. Stated differently, although the range of values of the major period includes the tolerance value represented by the tolerance value marker 836m, the direction of change in value of the major period is away from the tolerance value and towards the acceptance value represented by the acceptance value marker 836a.

FIG. 6 illustrates more examples of assignment of color to graphical objects 831 and/or portions of graphical objects 831. More specifically, three different instances of graphical object designated 831a through 831c are presented as examples of the application of various criterion to determine assigned colors. FIG. 6 also depicts an example of a horizontal orientation of graphical objects 831 and of an axis 838 in an example embodiment of vector graph 830 as may be visually presented on the display 580.

Presented across all three of the graphical objects 831a-c are examples of an alternative to the use of color to designated types of values marked by instances of value markers 836. Specifically, a dotted or dashed line is employed for goal value markers 836g indicating a goal value, and a solid line is employed for stretch goal value markers 836s indicating a stretch goal value. Also presented across all three of the graphical objects 831a-c are examples of an alternative to distinguishing between starting value markers 833s and ending values markers 833e based on the direction from which each intersects of a major period line 832. Specifically, each of the starting value markers 833s include an arrow (or other directional indicator) pointing into the major period line 832, and each of the ending value markers 833e include a corresponding arrow (or other directional indicator) pointing outwardly from the major period line 832.

As depicted, in the graphical object 831c, the major period line 832, the minor period arrow 834, starting value indicator 833s and the ending value indicator 833e are all assigned the color green. In some embodiments, this may reflect a default of assigning the color green to any graphical object 831 that reaches or crosses the stretch goal value marker 836s based on a determination that the value of green should be employed to convey going beyond a goal value regardless of whether there is a direction of change either towards or away the stretch goal value represented by the stretch goal value marker 836s. A similar default may exist of assigning the color yellow to any graphical object 831 that reaches or crosses the goal value marker 836g based regardless of whether there is a direction of change either towards or away from the goal value represented by the goal value marker 836g.

In contrast, a different default in the assignment of color may be employed with the graphical object 831a of which no portion reaches the goal value indicated by the goal value marker 836g. Specifically, the color red may be assigned by default to the major period line 832, starting value marker 833s and the ending value marker 833e based on no portion of the graphical object 831a reaching the goal value represented by the goal value marker 836g. However, in some embodiments, the color assigned to the minor period arrow 834 may depend on whether the minor period arrow 834 indicates a direction of change in values towards or away from the goal value. As depicted, the minor period arrow 834 is assigned the color amber (yellow), instead of the color of red, as a result of indicating a change in value during the minor period towards the goal value. Alternatively or additionally, the color assigned to the minor period arrow 834 may depend on how great a range of values 815 exists between the value at the end of the minor period represented by the minor period arrow 834 and the goal value. If the range of values 815 is within a predetermined threshold range, then the minor period arrow 834 may be assigned the color amber (yellow) as shown, instead of the color red. The processor component 550 may retrieve an indication of the threshold range of values from the settings data 538 and/or the configuration data 530.

It should be noted that despite the discussion of specific colors in the above example, any of a variety of colors may be employed to provide various indications of conditions and/or to provide a visually clear notice of a potential or actual problem requiring attention. Alternatively or additionally, one or more colors may be chosen based at least partly on what the values represent. By way of example, where the values represented by graphical objects 831 are related to weather, then colors including red and blue may be used to indicate general changes towards extreme high and low temperatures, respectively. A third color (e.g., gray) may be used to indicate more moderate changes in temperature. By way of another example, where the values represented by graphical objects 831 are related to predictions and/or results of an election, or to voting patterns across multiple elections, the colors associated with different ones of the political parties and/or candidates in the election may be used to indicate trends toward or away from a political party and/or a candidate. A third color representing a blending of two or more other colors (e.g., purple representing a blend of red and blue) may be used to denote a voting precinct that is closely split and/or that is deemed too close to call.

Figure 7:
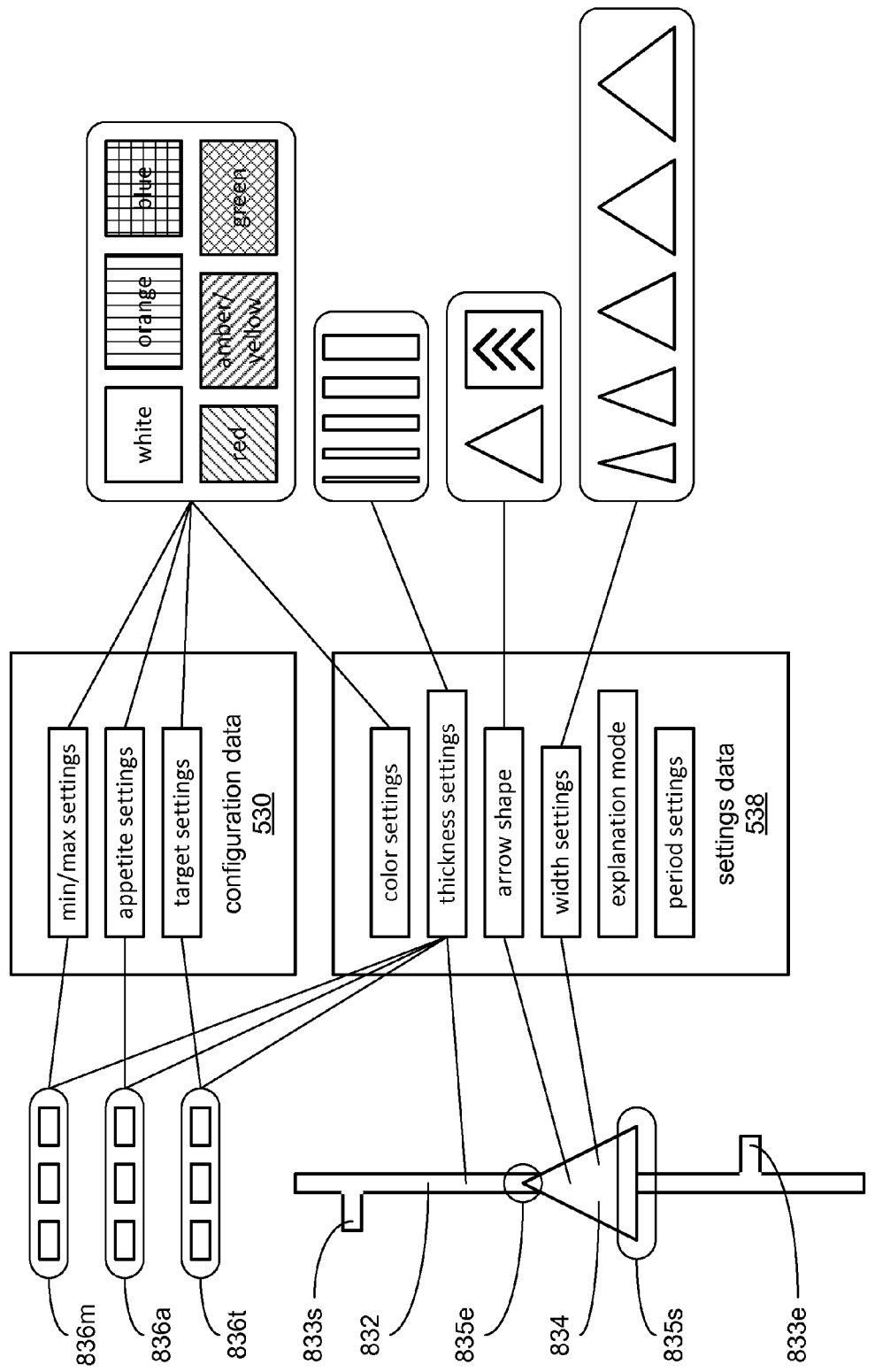
FIG. 7 illustrates an example of control of attributes of graphical objects.

FIG. 7 illustrates an example of the manner in which indications of selections included in various data structures may influence how at least each graphical object 831 may be generated. As depicted, the configuration data 530 may incorporate settings directed specifically to target value markers 836*t*, appetite value markers 836*a*, and tolerance value markers 836*m*, such as selections of colors used to designate each based on type of value (e.g., target value, appetite value, tolerance value, goal value, stretch value, etc.). Again, the configuration data 530 may reflect settings selected by an operator of the computing device 500, such as the manner in which the operator prefers different types of the value markers 836 to be visually indicated with color. Alternatively or additionally, the settings data 538 may incorporate settings that correlate selections of color to criterion under which each is used in generating major period lines 832 and minor period arrows 834 (e.g., what value marker 836 is crossed and/or the direction of change of values), settings correlating thicknesses and widths to different degrees of importance (as may be indicated in the display data 338), and/or selecting a shape or appearance for the minor period arrows 834. Again, the settings data 538 may accompany the data set 330, thereby allowing such selections to be made to effect some degree of consistency in the presentation of data derived from the data set 330 regardless of what computing device is employed to present it.

In executing the UI routine 540 to visually present the vector graph 830, the processor component 550 first retrieves the display data 338 indicating what values and/or ranges of values are to be included in a vector graph 830. Such values may include starting and ending values for major and/or minor periods, ranges of values occurring during major periods, target values, appetite values, and/or tolerance values. The processor component 550 may analyze the display data 338 to determine the lowest value and highest values to be visually presented to determine an overall range of all of the values to be visually presented. The processor component 550 may then employ those lowest and highest values to generate at least the axis 838 with a visual indication of the overall range that may include gradation markings.

The processor component 550 may parse the display data 338 to identify all values for which value markers 836 are to be visually presented. The processor component 550 may then generate those value markers 836. In so doing in some embodiments, the processor component 550 may parse the display data 338 for indications of relative degrees of importance of each such value, and then employ those indications to generate each of those value markers 836 with a line thickness 816 indicative of the relative degree of importance of the value represented. Alternatively or additionally, the processor component 550 may parse the display data 338 for indications of the type of value for each of the value markers 836, and then employ those indications to generate each of those value markers 836 with a color indicative of the type of value represented. In so doing the processor component 550 may retrieve indications of one or more assignments of color based on type of value from the settings data 538 and/or the configuration data 530 to employ in assigning colors based on type of value.

The processor component 550 may parse the display data 338 for indications of the major period ranges of values for which major period lines 832 are to be generated, along with values occurring at the start and end of each of those major periods. The processor component 550 may then generate those major period lines 832, along with accompanying starting value indicators 833*s* and ending value indicators 833*e* positioned at locations along the major period lines 832 indicative of the starting and ending values of the major periods they represent. In so doing, the processor component 550 may parse the display data 338 for indications of relative degrees of importance of each such range of values that may be included in the display data 338, and then employ those indications to generate each of those major period lines 832, starting value indicators 833*s* and ending value indicators 833*e* with line thicknesses 812 indicative of the relative degree of importance of the ranges of values represented. As previously discussed, the display data 338 may include explicit indications of the relative importance of values and/or ranges of values previously determined by any of a variety of techniques based on a prior analysis of the data set 330 and/or of still other data. Alternatively or additionally, the processor component 550 may analyze the display data 338 to determine directions of change and/or rates of change for the ranges of values represented by each of the major period lines 832. In so doing, the processor component 550 may retrieve indications of criterion to employ in such analysis from the settings data 538 and/or the configuration data 530. The processor component 550 may then employ the results of that analysis to determine a color to assign to each of those major period lines 832 and generate each of those major period lines 832 with its assigned color.

The processor component 550 may similarly parse the display data 338 for indications of values occurring at the start and end of each of minor period for which minor period arrows 834 are to be generated. The processor component 550 may then generate those minor period arrows 834 with their bases 835*s* and points 835*e* positioned along their corresponding major period lines 832 at locations indicative of the starting and ending values of the minor periods they represent. In so doing, the processor component 550 may parse the display data 338 for indications of relative degrees of importance of each such range of values that may be included in the display data 338, and then employ those indications to generate each of those minor period arrows 834 with a width 814 indicative of the relative degree of importance of the ranges of values represented. Again, as previously discussed, the display data 338 may include explicit indications of the relative importance of values and/or ranges of values previously determined by any of a variety of techniques based on a prior analysis of the data set 330 and/or still other data. Alternatively or additionally, the processor component 550 may analyze the display data 338 to determine directions of change and/or rates of change for the ranges of values represented by each of the minor period arrows 834. In so doing, the processor component 550 may retrieve indications of criterion to employ in such analysis from the settings data 538 and/or the configuration data 530. The processor component 550 may then employ the results of that analysis to determine a color to assign to each of those minor period arrows 834 and generate each of those minor period arrows 834 with its assigned color.

In determining thicknesses 812 and colors of major period lines 832, widths 814 and colors of minor period arrows 834, and/or thicknesses 816 and colors of value markers 836, the processor component 550 may additionally retrieve indications of selections of thicknesses, widths and/or colors from the configuration data 530 and/or the settings data 538. The configuration data 530 may include indications of selections made by an operator of the computing device 500, and the settings data 538 may include indications of selections conveyed to the computing device 500 with the data set 330.

In executing the UI routine 540, the processor component 550 may visually present a vector graph 830 on the display 580 as the processor component generates the graphical objects 831 and/or the axis 838 included therein. Alternatively, the processor component 550 may fully generate a representation of a vector graph 830 within the storage 560 before visually presenting the vector graph 830 on the display 580. Still other forms of staging of both generating and visually presenting components of a vector graph 830 will occur to those skilled in the art of graphics pipelines. Regardless of the exact manner in which a vector graph 830 is caused to be visually presented, it may be deemed desirable to provide an operator of the computing device 500 with visual guidance of the meaning of different thicknesses of the major period lines 832 and value markers 836, different widths of the minor period arrows 834, and/or different colors to assist the operator in interpreting the vector graph 830.

Figure 8:
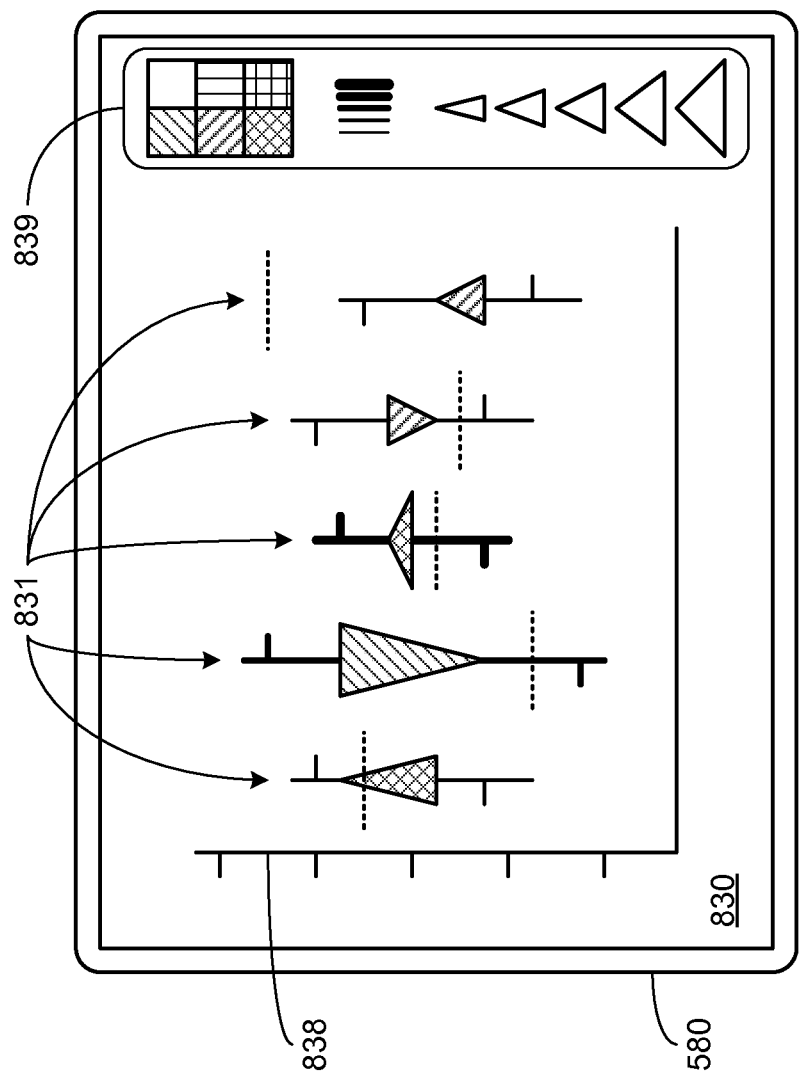
FIG. 8 illustrates an example of a vector graph including a legend.

FIG. 8 illustrates an example of a visual presentation of the vector graph 830 including a visual presentation of a legend 839 setting forth such information along an edge of the viewable area of the display 580 to avoid obscuring the visual presentation of the vector graph 830. The legend 839 may include textual explanations of meanings, or may simply display all of the possible thicknesses, widths, and/or colors to simply inform an operator of the computing device 500 of the possible range of each.

Alternatively or additionally, in executing the UI routine 540, the processor component 550 may monitor the position of a pointer 881 and/or another feature of a user interface to enable the operator to take an action to selectively trigger the visual presentation of textual or other information explaining details of data associated with a single graphical object 830.

Figure 9:
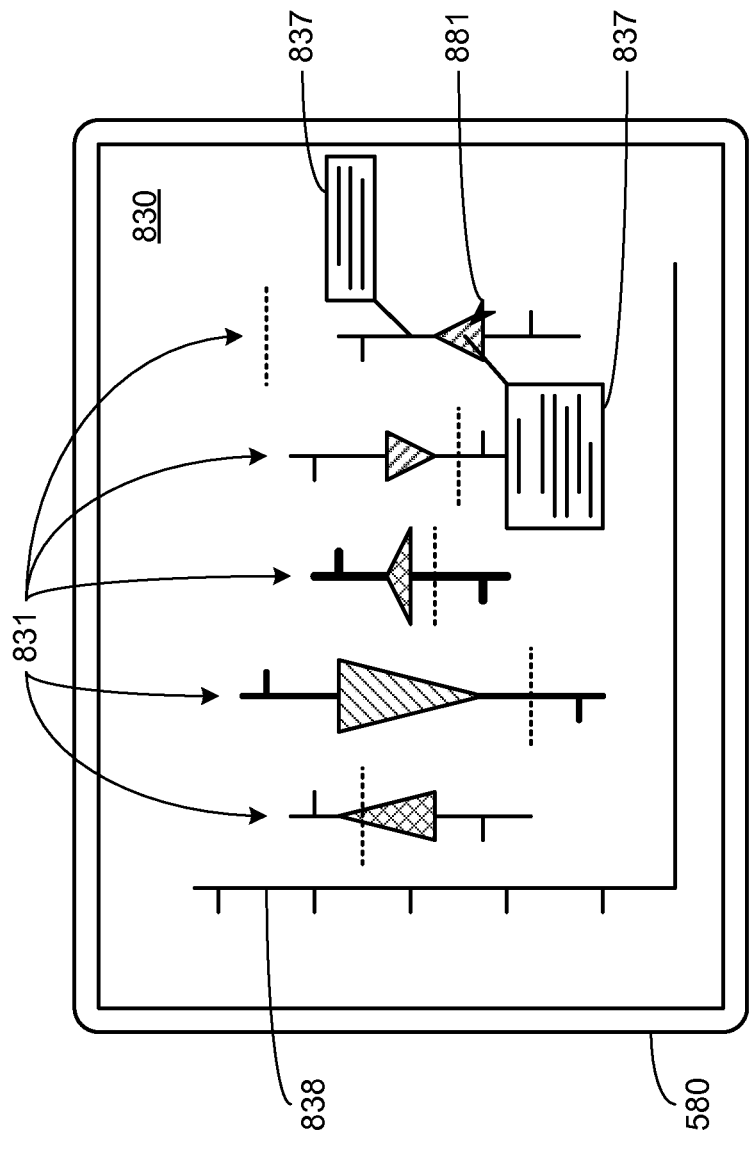
FIG. 9 illustrates an example of a vector graph including visual guides.

FIG. 9 illustrates an example of "pop-up" forms of visual guides 837 triggered to appear in the vicinity of one of the depicted graphical objects 831 as part of the visual presentation of a vector graph 830 in response to the processor component 550 detecting the "hovering" of the pointer 881 in the vicinity of that graphical object 831 (e.g., hovering at a location overlying a portion of that graphical object 831). The visual guides 837 may provide explanations of the meaning of thickness, width and/or color, or may detail exact numerical values at the start and end of the major and/or minor periods. Alternatively or additionally, the visual guides 837 may indicate what editing options are available during an editing mode in which an operator of the computing device 500 may be able to make selections affecting the visual appearance of one or more components of the vector graph 830, including the visual appearance of one or more of the graphical objects 831.

In some embodiments, in executing the UI routine 540, the processor component 550 may monitor the controls 520 (e.g., in the embodiment of the computing device 550 of FIG. 1) and/or the touch element 571 (e.g., in the embodiment of the computing device 500 of FIG. 2) for indications of manual operation to move the pointer 881 about the viewable area of the display 580 and/or to select an object visually presented on the display 580 underlying the pointer 881. As familiar to those skilled in the art, although the pointer 881 is depicted in FIG. 9 as having an "arrow head" shape, the pointer 881 may be visually presented with any of a variety of forms, such as a small cross, crosshairs extending the full height and width of the viewable area of the display 580, a hand, an hourglass, etc.

Figure 10:
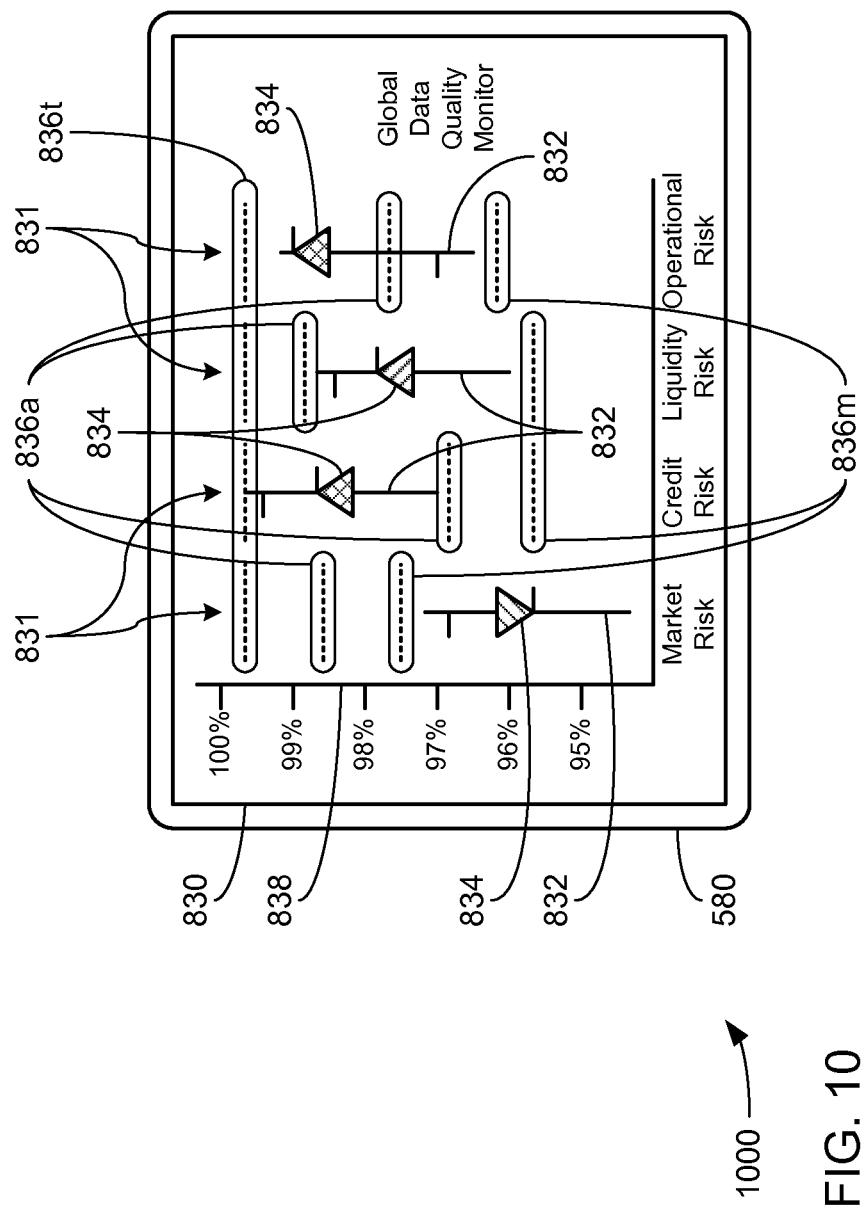
FIG. 10 illustrates an example of a use case of a vector graph.

FIG. 10 illustrates an example of use of a vector graph 830 to depict quality of data associated with risk management at a financial organization. As familiar to those skilled in the art, a values indicative of quality of data may be assigned to other pieces of data based on assessments of certainty of the correctness of that data. Such assessments may be arrived at statistically based on an analysis of the accuracy of data previously provided by a particular source. Alternatively or additionally, such assessments may be assigned based on various factors such as the fact that a new source with which there is little or no prior experience is used such that the source may not yet be deemed a proven source. Other mechanisms by which values of quality of data may be derived or assign will occur to those skilled in the art. Each of the four depicted graphical objects 831 includes a target value marker 836*t*, an appetite value marker 836*a* and a tolerance value marker 836*m*. A color coding inspired by colors commonly used in traffic lights may be employed to mark these value markers such that the target value markers 836*t* may be visually presented in green, the appetite value markers 836*a* may be visually presented in amber (yellow), and the tolerance value markers 836*m* may be visually presented in red.

Each of the major period lines 832 and the minor period arrows 834 may be assigned colors based at least partly on the change of values represented by each. Thus, for the graphical object 831 depicting the quality of data associated with market risk, the major period line 832 may be visually presented with the color red since it is worse than even the tolerance value indicated by its corresponding tolerance value marker 836*m* and is becoming worse as indicated by the relative positions of the starting value indicator 833*s* and the ending value indicator 833*e*. The minor period arrow 834 may also be visually presented in red for largely the same reasons.

For the graphical object 831 depicting the quality of data associated with credit risk, the major period line 832 may be visually presented with the color green since the range of values during the major period did reach the target value indicated by its corresponding target value marker 836*t*, despite not remaining at or above that target value. The minor period arrow 834 may also be visually presented in green due, at least in part, to showing a general direction of change in value during the minor period that progresses towards the target value.

For the graphical object 831 depicting the quality of data associated with liquidity risk, the major period line 832 may be visually presented with the color amber (yellow) since the range of values during the major period did come close to reaching the appetite value indicated by its corresponding appetite value marker 836a. This assignment of the color of amber (yellow) to the major period line 832 may be made in spite of a general direction of change in values away from the appetite value as indicated by the relative positions of the starting value indicator 833s and the ending value indicator 833e. The minor period arrow 834 may also be visually presented in amber (yellow) due, at least in part, to showing a general direction of change in value during the minor period that progresses towards the appetite value.

For the graphical object 831 depicting the quality of data associated with operational risk, the major period line 832 may be visually presented with the color yellow (amber) since the range of values during the major period did reach and exceed the appetite value indicated by its corresponding appetite value marker 836a. Further the general direction of the change in values during the major period is towards and beyond the appetite value as indicated by the relative positions of the starting value indicator 833s and the ending value indicator 833e. However, unlike the major period line 832, the minor period arrow 834 may be visually presented in green due to showing the starting and ending values of the minor period both being well above the appetite value, and due to a general direction of change in value during the minor period that progresses towards the target value indicated by the corresponding target value marker 836t.

Figure 11:
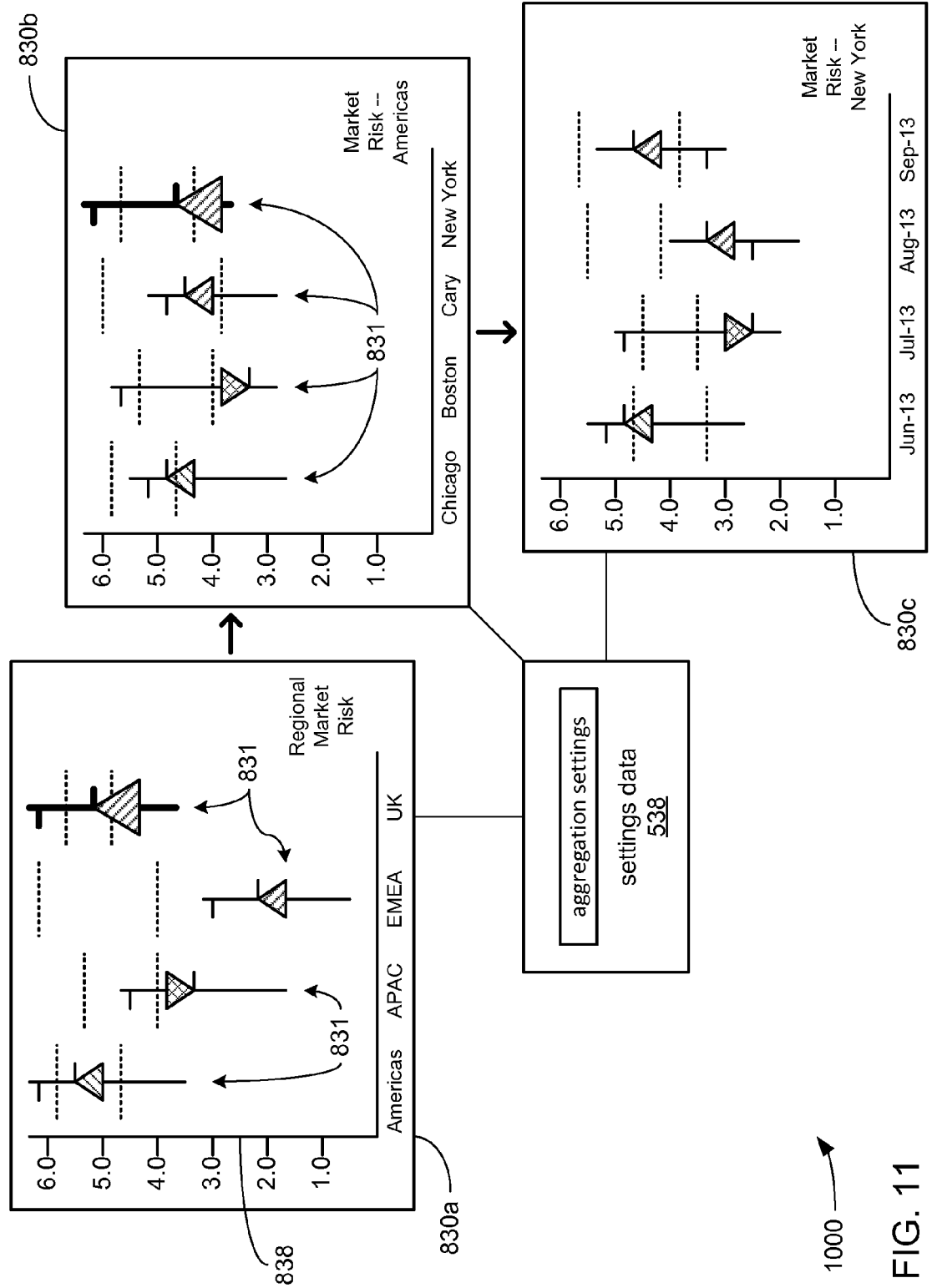
FIG. 11 illustrates an example of another use case of a vector graph.

FIG. 11 illustrates an example of use a succession of vector graphs 830a, 830b, and 830c to visually present data concerning market risk. More specifically, FIG. 11 illustrates an example of progressing through multiple vector graphs to "drill down" through visually presented data to reach more detailed data underneath. Specifically, in executing the UI routine 540, the processor component 550 initially generates the vector graph 830a depicting data values associated with regional market risk in four regions through four corresponding graphical objects 831.

In continuing to execute the UI routine 540, the processor component 550 awaits the receipt of input indicative of a command, such as the selection of one of the graphical objects 831 depicted in the vector graph 830a to "drill down" further into the data of the data set 330 that underlies the values it depicts. In the embodiment of the computing device 500 of FIG. 1, the processor component 550 may monitor the controls 520 for an indication of manual operation thereof to convey a command. In the embodiment of the computing device 500 of FIG. 2, the processor component 550 may operate the touch interface 575 to monitor the touch element 571 for an indication of operation to convey a command. Regardless of the exact mechanism by which it occurs, the processor component 550 receives an indication of the graphical object 831 depicting values and range of values for market risk for the Americas being selected.

In response to this selection, and in executing both the UI routine 540 and the application routine 510, the processor component 550 generates the vector graph 830b depicting the values and ranges of values from the data set 330 that were previously aggregated to generate the graphical object 831 for the Americas in the vector graph 830a. In earlier aggregating that data, the processor component 550 may retrieve aggregation settings indicating the type(s) of calculation to employ in aggregating data from the settings data 538, which may be received by the computing device 500 as part of or along with the data set 330. Thus, the aggregation settings of the settings data 538 may effectively define the mathematical relationship between data displayed by multiple graphical objects 831 in one vector graph and the aggregation of that data as displayed by a single graphical object 831 in another vector graph. As familiar to those skilled in the art, such aggregation calculations may including summations of data, averages of data, weighted averages of data, etc.

In continuing to execute the UI routine, the processor component 550 again awaits receipt of input indicative of a command. The processor component 550 then receives an indication of the graphical object 831 depicting values and ranges of values for market risk for New York being selected. In response, the processor component 550 generates the vector graph 830c depicting the values and ranges of values from the data set 330 that were previously aggregated to generate the graphical object 831 of New York in the vector graph 830b.

Figure 12:
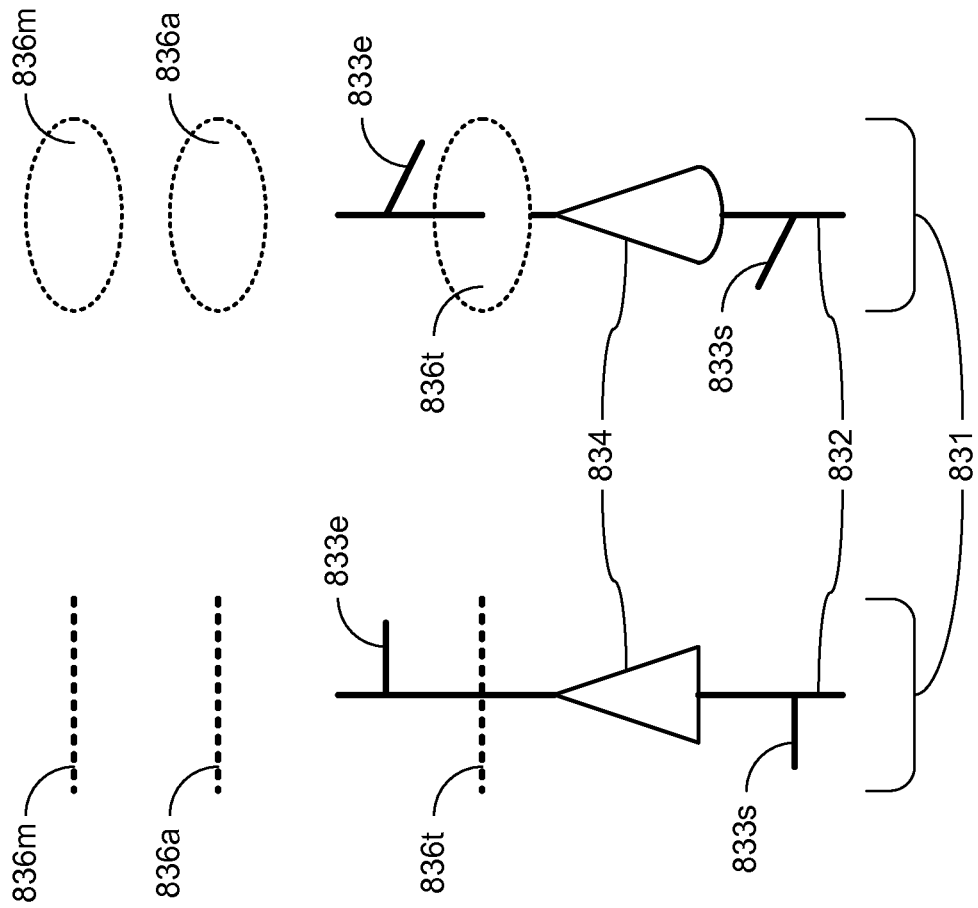
FIG. 12 illustrates an example three-dimensional view of a graphical object.

Although the vector graphs 830 depicted and described thus far provide two-dimensional (2D) views of values and/or ranges of values, other embodiments are possible in which vector graphs 830 providing three-dimensional (3D) views may be generated and/or visually presented. FIG. 12 depicts an example of a 3D view of a graphical object 831 alongside an example of a corresponding 2D view of the same graphical object 831. As depicted, the major period line 832, the starting value marker 833s and the ending value marker 833e may continue to be generated and visually presented as line segments. However, the minor period arrow 834 may be generated and visually presented as having a conical shape in the 3D view. Further, each of the target value marker 836t, the appetite marker 836a and the tolerance value marker 836m may be generated and visually presented as planes in the 3D view.

Figure 13:
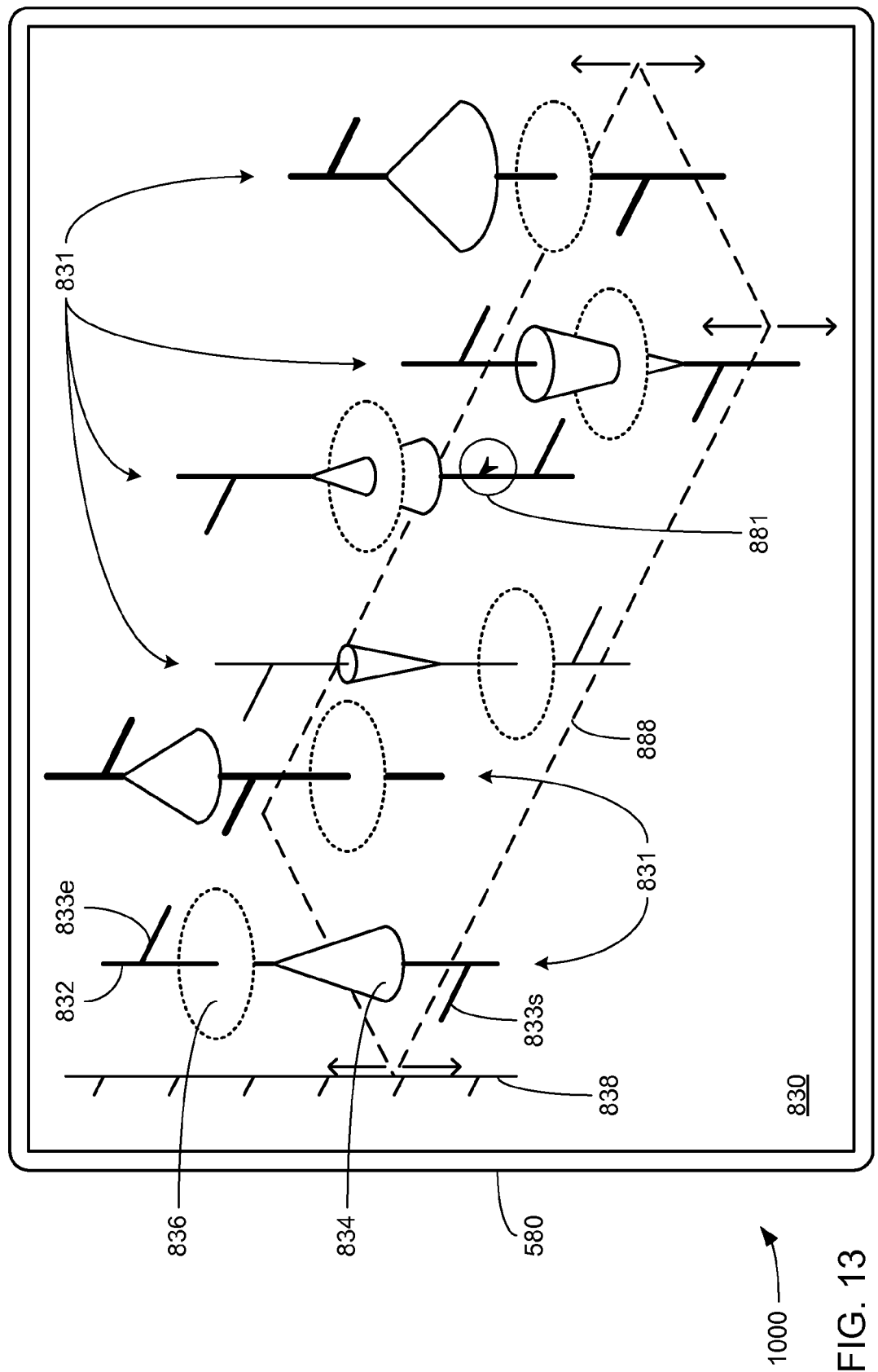
FIG. 13 illustrates an example three-dimensional view of a vector graph.

FIG. 13 depicts an example of a visual presentation of a vector graph 830 providing a 3D view of multiple graphical objects 831. Not unlike the example visual presentations of vector graphs 830 of FIGS. 8-11, the vector graph 830 may include an axis 838 with gradations to provide a scale of values for use in interpreting each of the graphical objects 831.

In some embodiments, in executing the UI routine 540, the processor component 550 may monitor the controls 520 (e.g., in the embodiment of the computing device 550 of FIG. 1) and/or the touch element 571 (e.g., in the embodiment of the computing device 500 of FIG. 2) for indications of manual operation to move the pointer 881 about the viewable area of the display 580 and/or to select an object visually presented on the display 580 underlying the pointer 881. Again, although the pointer 881 is depicted as having an "arrow head" shape, the pointer 881 may be visually presented with any of a variety of forms.

In response to the pointer 881 "hovering" over a portion of one of the graphical objects 831, the processor component 550 may generate and visually present a guide 888 that correlates the current position of the pointer 881 over a portion of the graphical object 831 to a value among the gradations of the axis 838. As depicted, the guide 888 may take the form of a plane extending across the paths of the major period lines 832 of the multiple graphical objects 831 of the vector graph 830. The processor component 550 may move the planar form of the guide 888 vertically with the pointer 881 in response to the pointer 881 being moved vertically along the path of the major period line 832 of one of the graphical objects 831 to enable an operator of the computing device 500 to obtain the value at the location of the pointer 881 along that path from the gradations along the axis 838.

Figure 14A:
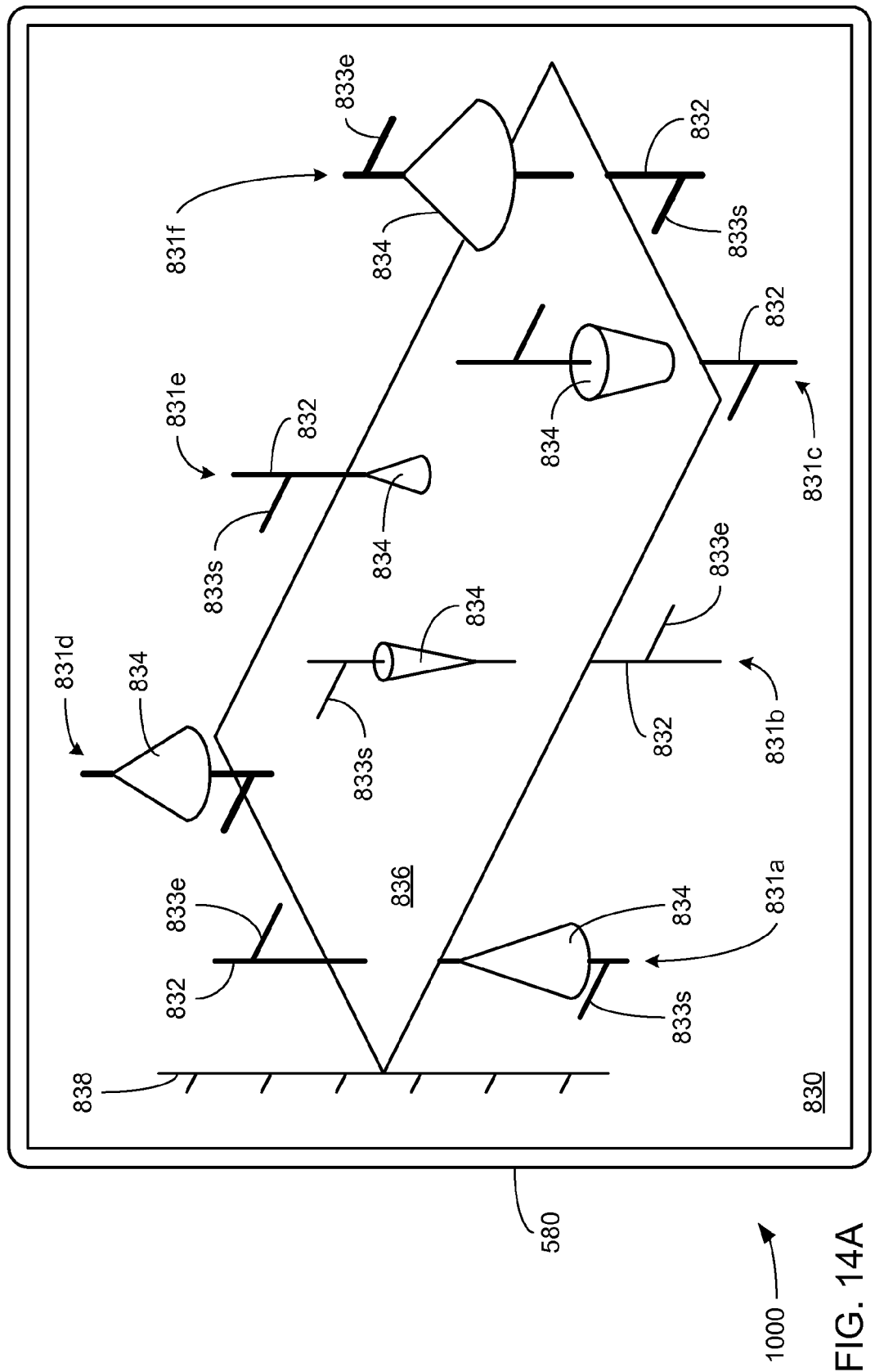
FIGS. 14A and 14B, together, illustrate another example three-dimensional view of a vector graph and a rotated elevational view thereof.

FIG. 14A depicts an alternate example of a visual presentation of a vector graph 830 providing a 3D view of multiple graphical objects 831a through 831f. Again, the vector graph 830 may include an axis 838 with gradations to provide a scale of values for use in interpreting each of the graphical objects 831a-f. Unlike the vector graph 830 of FIG. 13, in the vector graph 830 of FIG. 14, the graphical objects 831a-f have been normalized to align a selected value marker 836 present in each of the graphical objects 831a-f to occupy a shared plane. More precisely, one or more of the multiple graphical objects 831a-f have been shifted and/or rescaled along the paths of their major period lines 832 to cause a selected value marker 836 present in each of the graphical objects 831a-f to align in a shared plane. The selected one of the value markers 836 may represent any of a variety of types of relative value present in all of the multiple graphical objects 831a-f of the vector graph 830, including and not limited to, a target value, an appetite value, a tolerance value, a goal value or a stretch goal value. As depicted, the shared plane representing all of the selected one of the value markers 836 of the multiple graphical objects 831a-f may be visually presented as extending across the paths of the major period lines 832 of the multiple graphical objects, and may be visually presented as extending to the location of the axis 838 to visually present the relative value represented by the plane among the gradations of the axis 838.

Figure 14B:
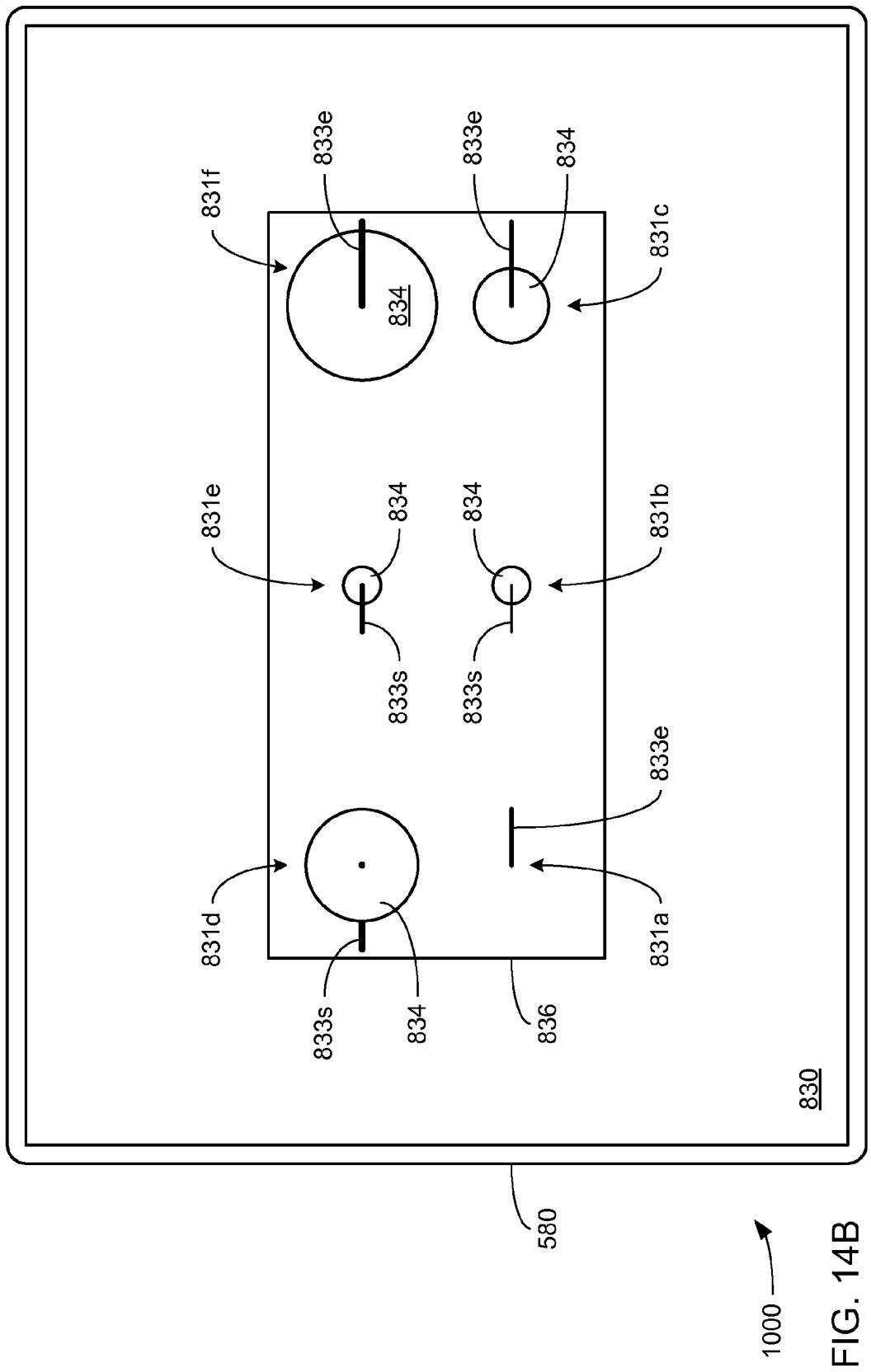

FIG. 14B depicts an example visual presentation of the same vector graph 830 of FIG. 14A rotated to provide an elevational view of the shared plane formed from the selected one of the value markers 836 of the graphical elements 831a-f, as described with regard to FIG. 14A. From the perspective afforded by this elevational view, the widths of at least a subset of the major period lines 832 may be seen. Also, the diameters of at least portions of at least a subset of the minor period arrows 834 that exist in front (from this elevational perspective) of the shared plane of the selected one of the value markers 836 may also be seen. Further, at least a subset of the starting value markers 833s and/or of the ending value markers 833e that exist in front (from this elevational perspective) of the shared plane may also be seen. Such an elevational view may be deemed useful to provide a depiction of activity across the multiple graphical objects 831a-f occurring at levels of values above or below such a shared plane.

Figure 15:
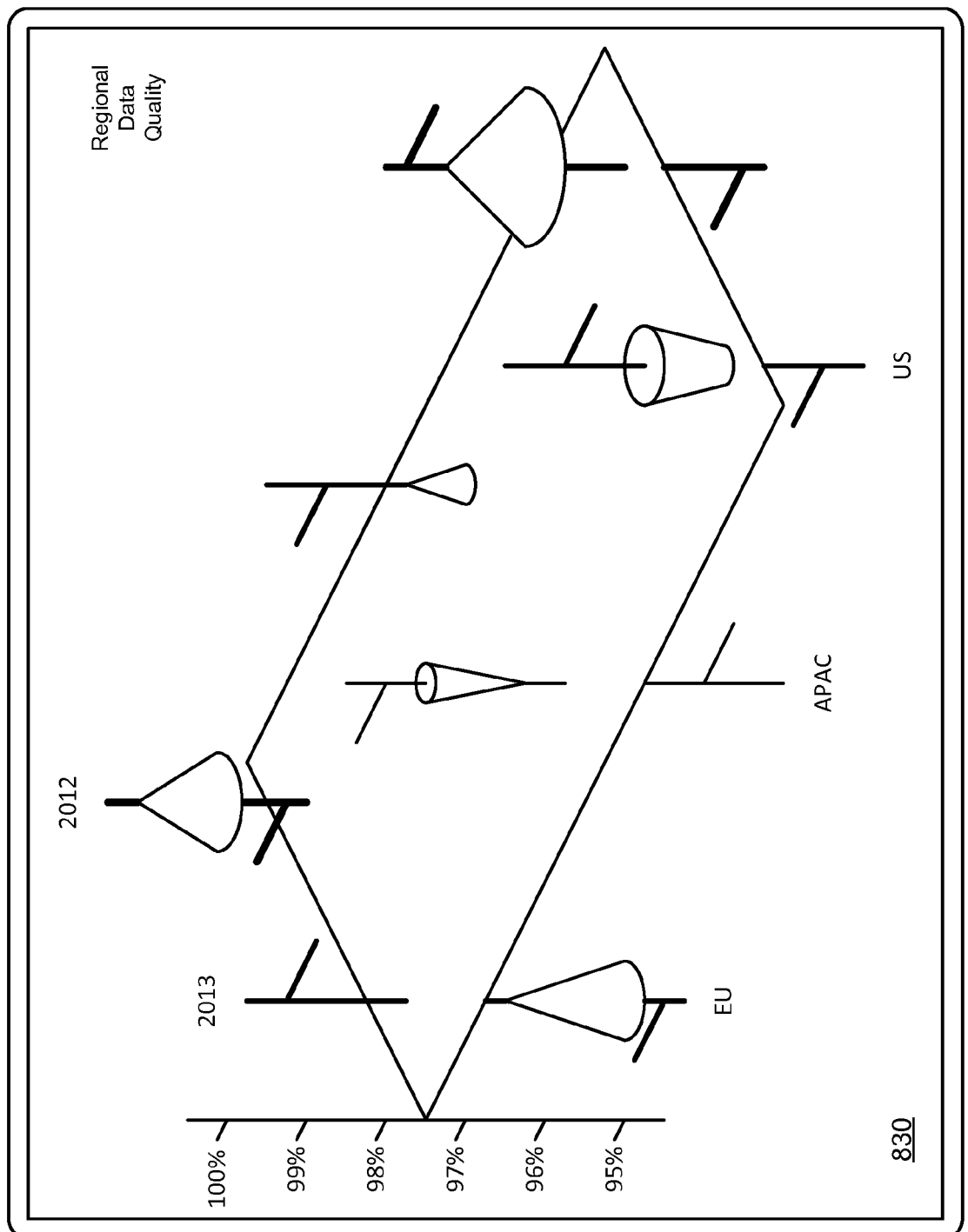
FIG. 15 illustrates an example use case of a three-dimensional view of a vector graph.

FIG. 15 illustrates an example of use of a 3D view provided by a visual presentation of a vector graph 830 in depicting quality of data associated with different regions over two succeeding years. As can be appreciated in comparison to the 2D view of quality of data depicted in FIG. 10, such a use of 3D perspective as depicted in FIG. 15 may enable the depiction of a greater quantity of graphical objects 831 in a manner that still enables relative ease of viewing and understanding of the values or ranges of values that each represents.

Returning to FIG. 1, in embodiments that include the graphics controller 600, the processor component 550 may be caused by further execution of the UI routine 540 to effect the generation of vector graphs (e.g., the various examples of vector graphs 830 and 830a-c, discussed above) by triggering the graphics controller 600 to render those vector graphs. In so doing, the processor component 550 may convey indications to the graphics controller 600 of the various data values and ranges of data values to be visually presented, selections of color, line thickness, arrow width, locations within the viewable area of the display 580, etc. In response, the processor component 650 of the graphics controller, in executing the graphics routine 640, generates the vector graphs 830. The processor component 650 may then operate the display interface 585 to render the vector graphs 830 onto the display 580. However, in alternate embodiments that do not include or do not make use of the graphics controller 600, the processor component 550 may itself render the vector graphs 830 on the display element 581. Thus, the processor component 550 may itself generate the vector graphs 830, and then may operate the display interface 585 to render the vector graphs 830 onto the display 580.

In various embodiments, each of the processor components 550 and 650 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

Although each of the processor components 550 and 650 may include any of a variety of types of processor, it is envisioned that the processor component 650 of the graphics controller 600 of the computing device 500 may be somewhat specialized and/or optimized to perform tasks related to graphics, including graphics rendering. More broadly, it is envisioned that the controller 600 servers as a graphics subsystem of the computing device 500 to enable the performance of tasks related at least to graphics rendering, using components separate and distinct from the processor component 550 and its more closely related components.

In various embodiments, each of the storages 560 and 660 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interface 590 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 16:
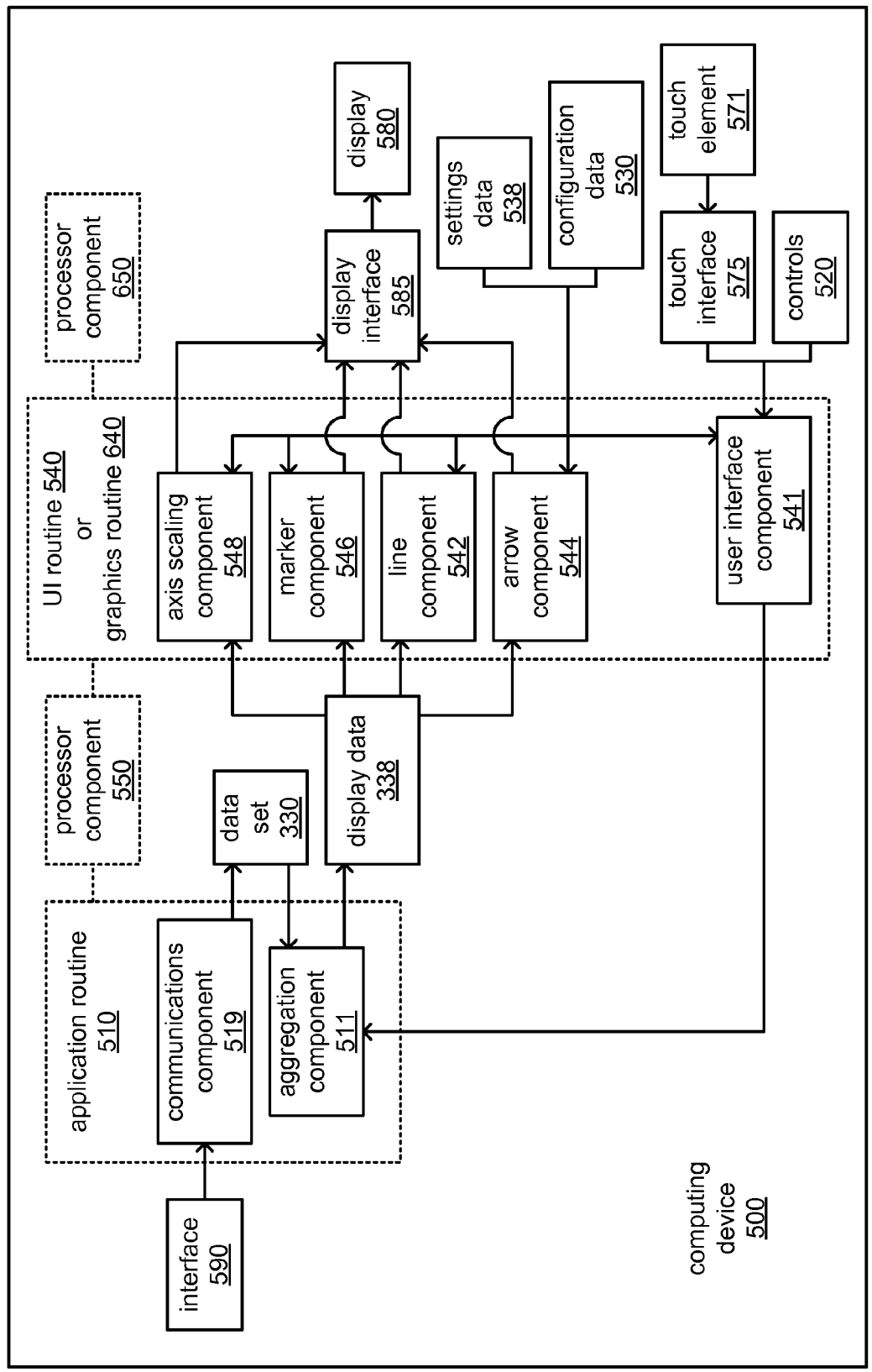
FIG. 16 illustrates an example of a portion of an embodiment of a visualization system.

FIG. 16 illustrates a block diagram of a portion of an embodiment of the touch-controlled system 1000 of FIG. 1 in greater detail. More specifically, FIG. 16 depicts aspects of the operating environment of the computing device 500 in which the processor components 550 and/or 650, in executing at least the UI routine 540 and/or the graphics routine 640, generates at least one embodiment of the vector graph 830 for visually presentation on a display such as the display 580. As recognizable to those skilled in the art, the UI routine 540 and/or the graphics routine 640, including the components of which each is composed, is selected to be operative on whatever type of processor or processors that are selected to implement the processor components 550 and/or 650.

In various embodiments, each of the application routine 510, the UI routine 540 and/or the graphics routine 640 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor components 550 and/or 650. Where one or more device drivers are included, those device drivers may provide support for any of a variety of other components, whether hardware or software components, of the computing device 500 and/or the graphics controller 600.

The application routine 510 may include a communications component 519 executable by the processor component 550 to operate the interface 590 to transmit and receive communications via the network 999 as has been described. Among the communications may be those conveying the data set 330 among one or more of the computing devices 300a-e and 500 via the network 999. As will be recognized by those skilled in the art, the communications component is selected to be operable with whatever type of interface technology is selected to implement the interface 590.

In embodiments in which the data set 330 is received from another computing device (e.g., one or more of the servers 300a-e), the communications component 519 may so receive the data set 330 via the network 999. Upon such receipt of the data set 330, the communications component 519 and/or another component of the application routine 510 provides a subset of the data set 330 to the UI routine 540 as the display data 338. Among such another component of the application routine 510 may be an aggregation component 511 executable by the processor component 550 to employ any of a variety of aggregation calculations to combine multiple values and/or ranges of values of the data set 330 to create values and/or ranges of values to be visually presented in one or more vector graphs 830. The application routine 510 may trigger the UI routine 540 to visually present one or more of those vector graphs 830.

The UI routine 540 and/or the graphics routine 640 may include an axis scaling component 548 executable by the processor components 550 and/or 650 to analyze the display data 338 to determine the lowest value and highest values to be visually presented to determine an overall range of all of the values to be visually presented. The axis scaling component 548 may then generate at least the axis 838 with a visual indication of the overall range that may include gradation markings.

The UI routine 540 and/or the graphics routine 640 may include a marker component 546 executable by the processor components 550 and/or 650 to parse the display data 338 to identify all values for which value markers 836 are to be visually presented, their relative degrees of importance and/or the types of value of each. The marker component 546 may then generate those value markers 836. In so doing, the marker component 546 may generate each of those value markers 836 with a line thickness 816 indicative of the relative degree of importance of the value represented and/or with a color indicative of the type of value represented. Further, in so doing, the marker component 546 may retrieve indications of line thickness and/or color selections from the configuration data 530 and/or the settings data 538.

The UI routine 540 and/or the graphics routine 640 may include a line component 542 executable by the processor components 550 and/or 650 to parse the display data 338 for indications of the major period ranges of values for which major period lines 832 are to be visually presented, along with values occurring at the start and end of each of those major periods. The line component 542 may also parse the display data 338 for indications of relative degrees of importance of each such range of values and/or analyze the display data 338 to determine general directions of change and/or rates of those general directions of change for the ranges of values represented by each of the major period lines 832. The line component 542 may then generate those major period lines 832, along with accompanying starting value indicators 833s and ending value indicators 833e positioned at locations along the major period lines 832 indicative of the starting and ending values of the major periods they represent. In so doing, the line component 542 may generate each of those major period lines 832, starting value indicators 833s and ending value indicators 833e with a line thickness 812 indicative of the relative degree of importance of the ranges of values represented, and/or with a color derived from the analysis of direction of change and/or rate of that change. Further, in so doing, the line component 542 may retrieve indications of line thickness and/or color selections from the configuration data 530 and/or the settings data 538.

The UI routine 540 and/or the graphics routine 640 may include an arrow component 544 executable by the processor components 550 and/or 650 to parse the display data 338 for indications of values occurring at the start and end of each of minor period for which minor period arrows 834 are to be visually presented. The arrow component 544 may also parse the display data 338 for indications of relative degrees of importance of each such range of values and/or analyze the display data 338 to determine directions of change and/or rates of change for the ranges of values represented by beach of the minor period arrows 834. The arrow component 544 may then generate those minor period arrows 834 with their bases 835s and points 835e positioned along their corresponding major period lines 832 at locations indicative of the starting and ending values of the minor periods they represent. In so doing, the arrow component 544 may generate each of those minor period arrows with a width 814 indicative of the relative degree of importance of the ranges of values represented, and/or with a color derived from the analysis of general direction of change and/or rate of that change. Further, the arrow component 544 may retrieve indications of arrow width and/or color selections from the configuration data 530 and/or the settings data 538.

As various components of the axis 838 and/or of graphical objects 831 are generated, the components 542, 544, 546 and/or 548 may operate the display interface 585 to visually present the axis 838 and/or graphical objects 831 on the display 580 as part of visually presenting a vector graph 830. Alternatively, the components 542, 544, 546 and/or 548 may store representations of the axis 838 and/or of graphical objects 831 in preparation for a subsequent visual presentation on the display 580 and/or another display.

The UI routine 540 and/or the graphics routine 640 may include a user interface component 541 executable by the processor components 550 and/or 650 to monitor the controls 520 and/or the touch element 571 (via the touch interface 575) for indications of manual operation to convey a command. Again, such commands may include commands to move a pointer 881 about the viewable area of the display 580 and/or to use the pointer 881 to select an object visually presented on the display 580. In response to a pointer 881 being manipulated to cause it to hover over a graphical object 831, the user interface component 541 may generate one or more visual guides in the vicinity of that graphical object 831 providing more explicit expression of an associated value or range of values.

Alternatively or additionally, in response to use of a pointer 881 (or other mechanism) to select a graphical object 831, the user interface component 541 may trigger the application routine 510 to generate new display data 338 made up of values and/or ranges of values that were previously aggregated to derive the values and/or ranges of values represented by the graphical object just selected. In response to the trigger from the user interface component, the application routine 510 may trigger the UI routine 540 and/or the graphics routine 640 to generate a new vector graph 830 presenting the new display data 338 to thereby enable an operator of the computing device 500 to "drill down" into the previously aggregated data.

Alternatively or additionally, in response to use of a pointer 881 (or other mechanism) to convey a command to "drill up" into a higher level of data from what is currently presented in a vector graph 830 on the display 580, the user interface component 541 may trigger the aggregation component 511 of the application routine 510 to generate new display data 338 made up of an aggregate of values and/or ranges of values, including those currently presented on the display 580. In response to the trigger from the user interface component, the application routine 510 may trigger the UI routine 540 and/or the graphics routine 640 to generate a new vector graph 830 presenting the new display data 338 to thereby enable the "drilling up" commanded by the operator of the computing device 500.

Figure 17:
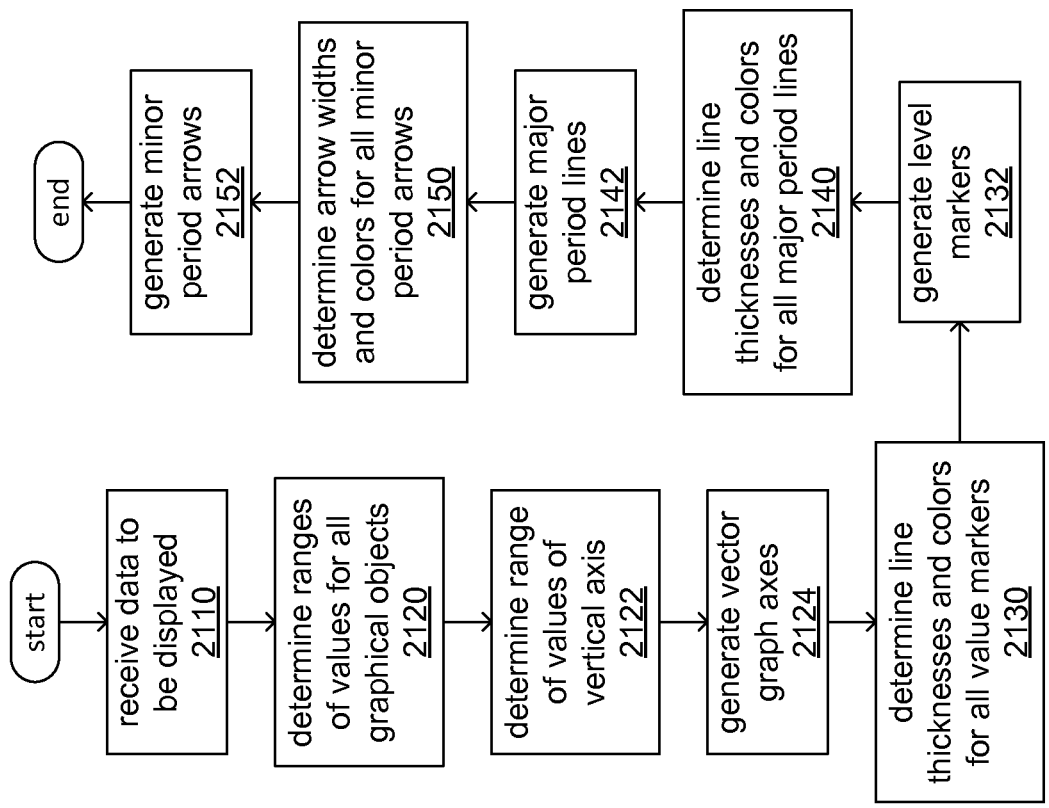
FIG. 17 illustrates an embodiment of a first logic flow.

FIG. 17 illustrates one embodiment of a logic flow 2100. The logic flow 2100 may be representative of some or all of the operations executed by one or more embodiments described herein. More specifically, the logic flow 2100 may illustrate operations performed by the processor components 550 and/or 650 in executing at least the UI routine 540 and/or the graphics routine 640, and/or performed by other component(s) of the computing device 500 and/or the controller 600 in visually presenting vector graphs 830.

At 2110, a processor component of a computing device (e.g., the processor component 550 of the computing device 500 and/or the processor component 650 of the controller 600) receives item data (e.g., the display data 338 derived from the data set 330), of which at least a portion is to be presented on display (e.g., the display 580, whether touch-sensitive or not) as one or more graphical objects in a vector graph (e.g., one or more graphical objects 831 in a vector graph 830). As previously discussed, the data set and the display data derived therefrom may be any of a variety of types of data, including and not limited to, financial data, economic data, scientific data, census data, election data, etc.

At 2120, the display data is analyzed to determine all of the ranges of values for all of the graphical objects to be visually presented. As previously discussed, determining the lowest and highest values among all of the values and/or ranges of values to be visually presented with graphical objects enables an overall range of values to be determined, thereby enabling a range of values for an axis of the vector graph to be determined at 2122. At 2124, that axis is generated on the display.

At 2130, the display data is parsed to determine the degrees of importance of each value to be visually presented with a value marker, and to determine the types of value of each of those values. As previously discussed, determining the degrees of importance of each such value enables the line thickness of the value marker representing it to be determined. Also, determining type of value (e.g., target value, appetite value, tolerance value, etc.) enables the color of the value marker representing it to be determined. At 2132, each of the value markers is generated with its associated line thickness and color.

At 2140, the display data is parsed to determine the degrees of importance of each range of values to be visually presented with a major period line to enable line thicknesses of the major period lines to be determined. The display data is also analyzed to determine general directions of change in ranges of values for each major period line to enable colors of the major period lines to be determined. At 2142, each of the major period lines is generated with its associated line thickness and color. In so doing, ends of each major period line are positioned at locations indicating the range of the values occurring during its associated major period, and the starting value indicators and ending value indicators for each of the major period lines are also generated.

At 2150, the display data is parsed to determine the degrees of importance of each range of values to be visually presented with a minor period arrow to enable arrow widths of the minor period arrows to be determined. The display data is also analyzed to determine general directions of change in ranges of values for each minor period arrow to enable colors of the minor period arrows to be determined. At 2152, each of the minor period arrows is generated with its associated arrow width and color. In so doing, the base and point of each minor period arrow is positioned at locations indicating values at the start and end, respectively, of its associated minor period.

Figure 18:
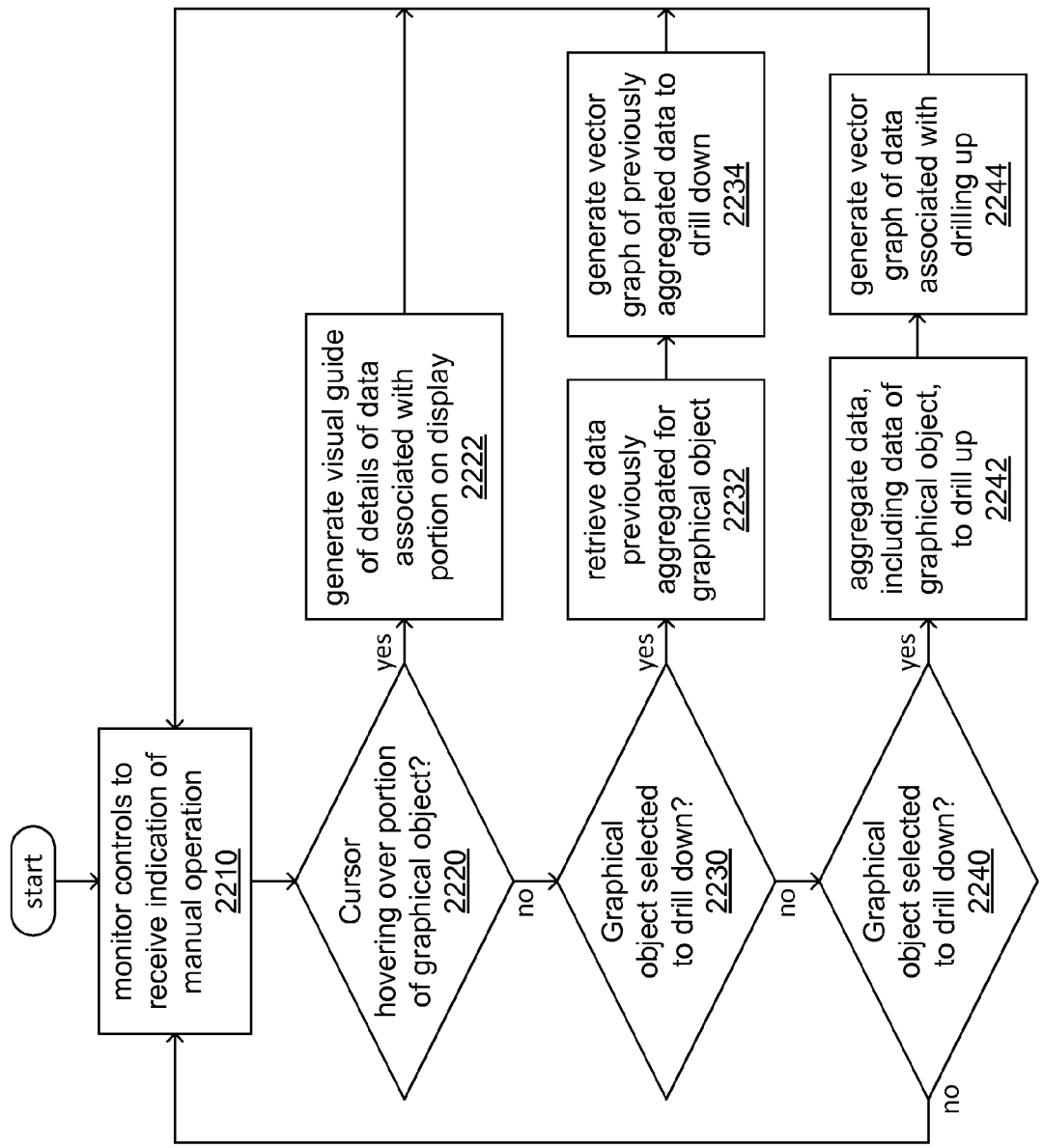
FIG. 18 illustrates an embodiment of a second logic flow.

FIG. 18 illustrates one embodiment of a logic flow 2200. The logic flow 2200 may be representative of some or all of the operations executed by one or more embodiments described herein. More specifically, the logic flow 2200 may illustrate operations performed by the processor components 550 and/or 650 in executing the application routine 510, the UI routine 540 and/or the graphics routine 640, and/or performed by other component(s) of the computing device 500 and/or the controller 600 in visually presenting vector graphs 830.

At 2210, during visual presentation of a vector graph including one or more graphical objects (e.g., a vector graph 830 including one or more graphical objects 831), a processor component of a computing device (e.g., the processor component 550 of the computing device 500 and/or the processor component 650 of the controller 600) monitors manually operable controls (e.g., the controls 520 and/or the touch element 571) to receive an indication of manual operation thereof to convey a command. As has been discussed, such a command may be a command to move a pointer (e.g., the pointer 881) about and/or a command to select a visually presented object (e.g., a graphical object 831 of a vector graph 830).

At 2220, a check is made as to whether the pointer has been caused to hover over a portion of a graphical object. The portion of the graphical object may be a value marker, a major period line, a starting value indicator, an ending value indicator or a minor period arrow. If a pointer is hovering over a portion of a graphical object, then at 2222, one or more visual guides are generated in the vicinity of that graphical object that present details of data associated with at least that portion of the graphical object.

At 2230, a check is made as to whether a graphical object has been selected to drill down into the data that had been aggregated to generate the values and/or ranges of values that the graphical object visually presents. If a graphical object is so selected, then at 2232, the data that was previously aggregated for that graphical object is retrieved. At 2234, a new vector graph is generated that includes new graphical objects that represent the values and/or ranges of values of the previously aggregated data.

At 2240, a check is made as to whether a graphical object has been selected to drill up into a higher level of aggregation data that is to include the values and/or ranges of values represented by the graphical object. If a graphical object is so selected, then at 2242, the data of that graphical object (e.g., the values and ranges of values it represents) is so aggregated together with other data to generate the higher level of aggregated data. At 2244, a new vector graph is generated that includes new graphical objects that represent values and/or ranges of values of the higher level aggregated data.

Figure 19:
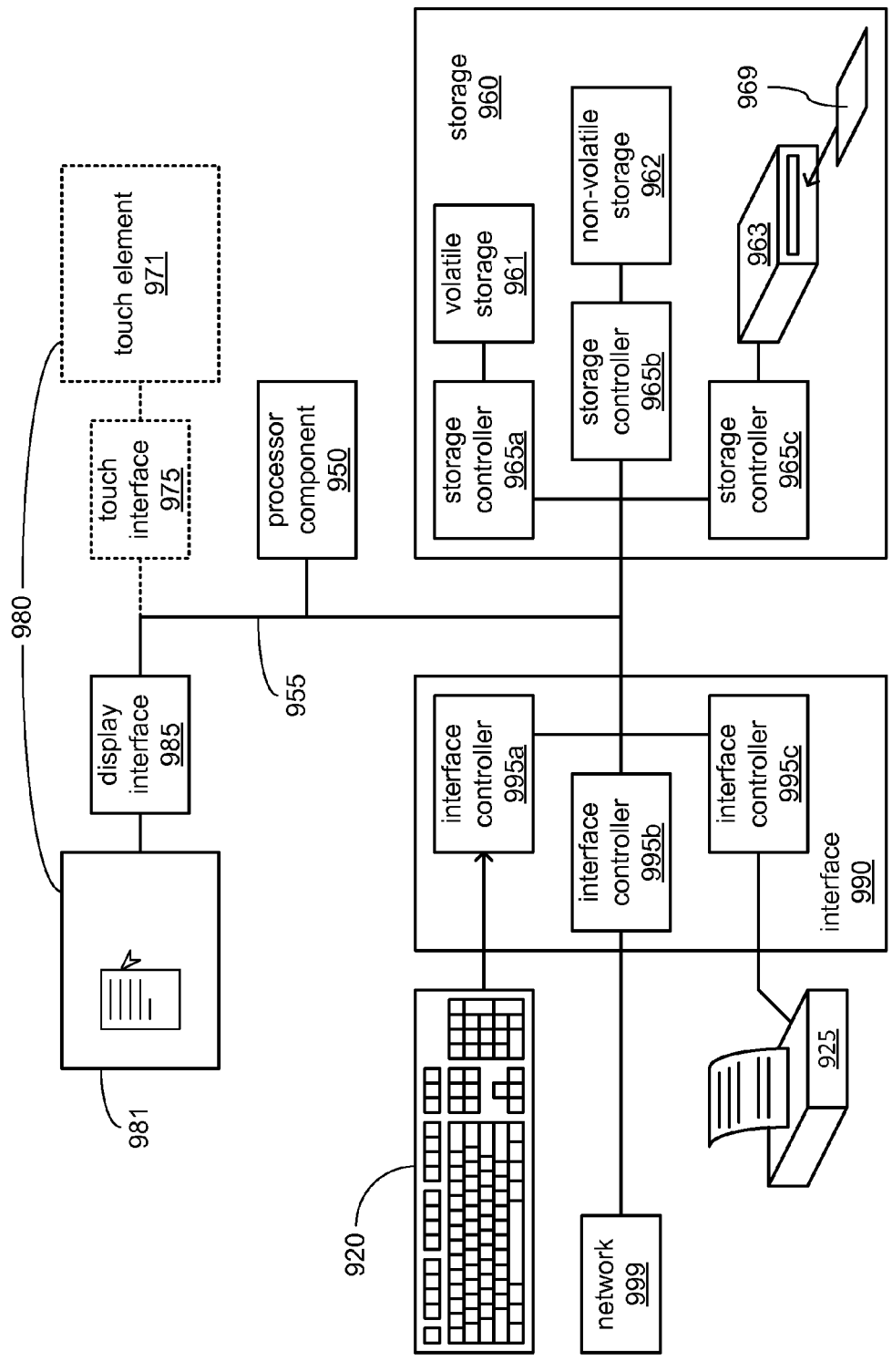
FIG. 19 illustrates an embodiment of a processing architecture.

FIG. 19 illustrates an embodiment of a processing architecture 3000 suitable for implementing various embodiments as previously described. More specifically, the processing architecture 3000 (or variants thereof) may be implemented as part of one or more of the computing devices 300 or 500, or the controller 700. It should be noted that components of the processing architecture 3000 are given reference numbers in which the last two digits correspond to the last two digits of reference numbers of at least some of the components earlier depicted and described as part of the computing devices 300 and 500, as well as the controller 700. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a touch screen 980 incorporating one or more of a touch element 971, a touch interface 975, a display element 981 and a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350 and 550) may include any of a wide variety of commercially available processors, employing any of a wide variety of technologies and implemented with one or more cores physically combined in any of a number of ways.

As previously discussed, the storage 960 (corresponding to the storages 360 and 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage device in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interfaces 190, 390 or 690) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995*a*, 995*b* and 995*c*. The interface controller 995*a* may employ any of a variety of types of wired digital serial interface or radio frequency wireless interface to receive serially transmitted messages from user input devices, such as the depicted keyboard 920. The interface controller 995*b* may employ any of a variety of cabling-based or wireless timings and/or protocols to access other computing devices through the depicted network 999 (perhaps a network made up of one or more links, smaller networks, or perhaps the Internet). The interface 995*c* may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a touch screen (e.g., the depicted example touch screen 980, corresponding to the touch screen 580), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. At least one non-transitory machine-readable storage medium comprising instructions that when executed by a computing device, cause the computing device to:
   determine a major range of values occurring during a major period, wherein the major period comprises a minor period of shorter duration than the major period;
   generate, by circuitry for visual presentation on a display,
      a vector graph comprising a graphical object and an axis indicating a scale of values comprising the major range, wherein the graphical object comprises:
         a major period line that is parallel to the axis, wherein a length of the major period line indicates the major range of values; and
         a minor period arrow overlying the major period line and pointing in a direction parallel to the length of the major period line, wherein a point of the minor period arrow overlies the major period line at a first location that indicates a value at an end of the minor period, and a base of the minor period arrow overlies the major period line at a second location that indicates a value at a start of the minor period;
      generate a starting value indicator coupled to the major period line at a third location that indicates a value at a start of the major period, and an ending value indicator coupled to the major period line at a fourth location that indicates a value at an end of the major period;
   determine a color of the major period line based on a direction of change in values during the major period represented by relative positions of the third and fourth locations along the major period line and relative to a value marker aligned with a path along which the major period line extends, and based on the value marker indicating at least one of a target value, an appetite value, or a tolerance value; and
   determine a color of the minor period arrow based on a direction of change in values during the minor period represented by the direction in which the minor period arrow points along the major period line relative to the value marker, and based on the value marker indicating at least one of a target value, an appetite value, or a tolerance value, wherein the color of the minor period arrow differs from the color of the major period line.

2. The machine-readable storage medium of claim 1, the instructions further causing the computing device to:
   generate a pointer overlying the vector graph;
   monitor an input device for an indication of operation of the input device to manipulate the pointer; and
   generate a visual guide indicating a numeric value associated with at least one of the first, second, third or fourth locations in response to operation of the input device to cause the pointer to hover over a portion of the graphical object.

3. The machine-readable storage medium of claim 1, the instructions further causing the computing device to:
   determine a thickness of the major period line based on a degree of importance of the major range of values; and
   determine a width of the minor period arrow based on a degree of importance of a range of values represented by the minor period arrow.

4. The machine-readable storage medium of claim 1, the instructions further causing the computing device to:
   generate a pointer overlying the vector graph;
   monitor an input device for an indication of operation of the input device to manipulate the pointer; and
   generate an indication of at least one of a meaning of a color of the major period line, a meaning of a color of the minor period arrow, a meaning of a thickness of the major period line or a meaning of a width of the minor period arrow in response to operation of the input device to cause the pointer to hover over a portion of the graphical object.

5. The machine-readable storage medium of claim 1, the instructions further causing the computing device to aggregate multiple ranges of values occurring during the major period to generate the major range of values.

6. The machine-readable storage medium of claim 5, the instructions further causing the computing device to:
   monitor an input device for an indication of operation of the input device to select the graphical object; and generate a graphical object for at least one of the multiple ranges occurring during the major period.

7. The machine-readable storage medium of claim 1, the instructions further causing the computing device to:
monitor an input device for an indication of operation of the input device to select a perspective from which to view the vector graph; and
visually present the vector graph in one of a three-dimensional perspective view, a first elevational view in which the axis is visually presented to extend horizontally or vertically, and a second elevational view rotated relative to the first elevational view in which the axis is visually presented to extend into and out of the display in response to the indication of operation of the input device.

8. The machine-readable storage medium of claim 7, the instructions further causing the computing device to, while the vector graph is visually presented in the three-dimensional perspective view:
generate a pointer overlying the vector graph;
monitor the input device for an indication of operation of the input device to manipulate the pointer; and
generate a plane oriented perpendicularly relative to the axis, wherein the plane is to serve as a guide to correlate a location indicative of a value along the axis to a fifth location along the major period line, wherein the fifth location corresponds to a position of the pointer relative to the major period line.

9. A computer-implemented method comprising:
determining a major range of values occurring during a major period, wherein the major period comprises a minor period of shorter duration than the major period;
generating, by circuitry for visual presentation on a display, a vector graph comprising a graphical object and an axis indicating a scale of values comprising the major range, wherein the graphical object comprises:
a major period line that is parallel to the axis, wherein a length of the major period line indicates the major range of values;
a starting value indicator coupled to the major period line at a first location that indicates a value at a start of the major period;
an ending value indicator coupled to the major period line at a second location that indicates a value at an end of the major period; and
a minor period arrow overlying the major period line and pointing in a direction parallel to the length of the major period line, wherein a point of the minor period arrow overlies the major period line at a third location that indicates a value at an end of the minor period, and a base of the minor period arrow overlies the major period line at a fourth location that indicates a value at a start of the minor period;
determining a color of the major period line based on a direction of change in values during the major period represented by relative locations of the first and second locations along the major period line and relative to a value marker aligned with a path along which the major period line extends, and based on the value marker indicating at least one of a target value, an appetite value or a tolerance value; and
determining a color of the minor period arrow based on a direction of change in values during the minor period represented by the direction in which the minor period arrow points along the major period line relative to the value marker, and based on the value marker indicating at least one of a target value, an appetite value or a tolerance value, wherein the color of the minor period arrow differs from the color of the major period line.

10. The computer-implemented method of claim 9, comprising:
determining a thickness of the major period line based on a degree of importance of the major range of values; and
determining a width of the minor period arrow based on a degree of importance of a range of values represented by the minor period arrow.

11. The computer-implemented method of claim 9, the color of the major period line selected from one of red, amber (yellow) and green, and the color of the minor period arrow selected from one of red, amber (yellow) and green.

12. The computer-implemented method of claim 9, comprising:
generating a pointer overlying the vector graph;
monitoring an input device for an indication of operation of the input device to manipulate the pointer; and
generating a visual guide indicating a numeric value associated with at least one of the first, second, third or fourth locations in response to operation of the input device to cause the pointer to hover over a portion of the graphical object.

13. The computer-implemented method of claim 9, comprising:
generating a pointer overlying the vector graph;
monitoring an input device for an indication of operation of the input device to manipulate the pointer; and
generating an indication of at least one of a meaning of a color of the major period line, a meaning of a color of the minor period arrow, a meaning of a thickness of the major period line or a meaning of a width of the minor period arrow in response to operation of the input device to cause the pointer to hover over a portion of the graphical object.

14. The computer-implemented method of claim 9, comprising aggregating multiple ranges of values occurring during the major period to generate the major range of values.

15. The computer-implemented method of claim 14, comprising:
monitoring an input device for an indication of operation of the input device to select the graphical object; and
generating a graphical object for at least one of the multiple ranges occurring during the major period.

16. The computer-implemented method of claim 9, comprising:
monitoring an input device for an indication of operation of the input device to select a perspective from which to view the vector graph; and
visually presenting the vector graph in one of a three-dimensional perspective view, a first elevational view in which the axis is visually presented to extend horizontally or vertically, and a second elevational view rotated relative to the first elevational view in which the axis is visually presented to extend into and out of the display in response to the indication of operation of the input device.

17. The computer-implemented method of claim 16, comprising, while the vector graph is visually presented in the three-dimensional perspective view:
generating a pointer overlying the vector graph;
monitoring the input device for an indication of operation of the input device to manipulate the pointer; and
generating a plane oriented perpendicularly relative to the axis, wherein the plane is to serve as a guide to correlate a location indicative of a value along the axis to a fifth location along the major period line, wherein the fifth location corresponds to a position of the pointer relative to the major period line.

18. An apparatus comprising a processor and a storage to store instructions that, when executed by the processor, cause the processor to perform operations comprising:
  determine a major range of values occurring during a major period, wherein the major period comprises a minor period of shorter duration than the major period;
  generate for visual presentation on a display:
    an axis of a vector graph indicating a scale of values comprising the major range;
    a major period line of a graphical object of the vector graph parallel to the axis;
    a starting value indicator of the graphical object coupled to the major period line at a first location that indicates a value at a start of the major period;
    an ending value indicator of the graphical object coupled to the major period line at a second location that indicates a value at an end of the major period, wherein a length of the major period line indicates the major range of values; and
    a minor period arrow of the graphical object overlying the major period line and pointing in a direction parallel to the length of the major period line, wherein a point of the minor period arrow overlies the major period line at a third location that indicates a value at an end of the minor period, and a base of the minor period arrow overlies the major period line at a fourth location that indicates a value at a start of the minor period;
  determine a color of the major period line based on a direction of change in values during the major period represented by relative locations of the first and second locations along the major period and relative to the value marker, and based on the value marker indicating at least one of a target value, an appetite value or a tolerance value; and
  determine a color of the minor period arrow based on the direction of change in values during the minor period represented by a direction in which the minor period arrow points along the major period line relative to the value marker, and based on the value marker indicating at least one of a target value, an appetite value or a tolerance value, wherein the color the minor period arrow differs from the color of the major period line.

19. The apparatus of claim 18, wherein the processor is caused to:
  determine a thickness of the major period line based on a degree of importance of the major range of values; and
  determine a width of the minor period arrow based on a degree of importance of a range of values represented by the minor period arrow.

20. The apparatus of claim 18, wherein:
  the color of the major period line selected from one of red, amber (yellow) and green; and
  the color of the minor period arrow selected from one of red, amber (yellow) and green.

21. The apparatus of claim 18, wherein the processor is caused to:
  generate a pointer overlying the vector graph;
  monitor an input device for an indication of operation of the input device to manipulate the pointer; and
  generate a visual guide indicating a numeric value associated with at least one of the first, second, third or fourth locations in response to operation of the input device to cause the pointer to hover over a portion of the graphical object.

22. The apparatus of claim 18, wherein the processor is caused to:
  generate a pointer overlying the vector graph;
  monitor an input device for an indication of operation of the input device to manipulate the pointer; and
  generate an indication of at least one of a meaning of a color of the major period line, a meaning of a color of the minor period arrow, a meaning of a thickness of the major period line or a meaning of a width of the minor period arrow in response to operation of the input device to cause the pointer to hover over a portion of the graphical object.

23. The apparatus of claim 18, wherein the processor is caused to aggregate multiple ranges of values occurring during the major period to generate the major range of values.

24. The apparatus of claim 23, wherein the processor is caused to:
  monitor an input device for an indication of operation of the input device to select the graphical object; and
  generate a graphical object for at least one of the multiple ranges occurring during the major period.

25. The apparatus of claim 18, comprising:
  the display; and
  a display interface to visually present the vector graph on the display.

26. The apparatus of claim 18, wherein the processor is caused to:
  monitor an input device for an indication of operation of the input device to select a perspective from which to view the vector graph; and
  visually present the vector graph in one of a three-dimensional perspective view, a first elevational view in which the axis is visually presented to extend horizontally or vertically, and a second elevational view rotated relative to the first elevational view in which the axis is visually presented to extend into and out of the display in response to the indication of operation of the input device.

27. The apparatus of claim 26, wherein the processor is caused to, while the vector graph is visually presented in the three-dimensional perspective view:
  generate a pointer overlying the vector graph;
  monitor the input device for an indication of operation of the input device to manipulate the pointer; and
  generate a plane oriented perpendicularly relative to the axis, wherein the plane is to serve as a guide to correlate a location indicative of a value along the axis to a fifth location along the major period line, wherein the fifth location corresponds to a position of the pointer relative to the major period line.

* * * * *